(12) United States Patent
Greene

(10) Patent No.: US 8,630,994 B2
(45) Date of Patent: Jan. 14, 2014

(54) SYSTEM FOR MULTIPLE TASKS ON A DISPLAY

(76) Inventor: Evan Greene, Redondo Beach, CA (US)

( * ) Notice: Subject to any disclaimer, the term of this patent is extended or adjusted under 35 U.S.C. 154(b) by 0 days.

(21) Appl. No.: 13/439,600

(22) Filed: Apr. 4, 2012

(65) Prior Publication Data

US 2012/0259827 A1    Oct. 11, 2012

Related U.S. Application Data

(60) Provisional application No. 61/473,007, filed on Apr. 7, 2011, provisional application No. 61/473,050, filed on Apr. 7, 2011.

(51) Int. Cl.
*G06F 17/30* (2006.01)
(52) U.S. Cl.
USPC .......................................................... 707/706
(58) Field of Classification Search
USPC ........................................ 707/706, 707, 712
See application file for complete search history.

(56) References Cited

U.S. PATENT DOCUMENTS

| | | | |
|---|---|---|---|
| 6,639,606 B1 | 10/2003 | Choi | |
| 7,065,518 B2 | 6/2006 | Nishioka et al. | |
| 7,207,001 B2 | 4/2007 | Bailey et al. | |
| 7,774,698 B2 | 8/2010 | Sattler et al. | |
| 7,873,622 B1 * | 1/2011 | Karls et al. | 707/707 |
| 2003/0093409 A1 | 5/2003 | Weil et al. | |
| 2008/0046407 A1 * | 2/2008 | Shah et al. | 707/3 |
| 2008/0204424 A1 * | 8/2008 | Jin et al. | 345/173 |
| 2011/0167058 A1 * | 7/2011 | van Os | 707/722 |

OTHER PUBLICATIONS

Personalize iGoogle: Canvas view (full-screen gadgets)—http://support.google.com/websearch/bin/answers.py?hl+en&answer=20324—2 pages, Aug. 6, 2012.
GroupDock Developer—http://dev.groupdock.com/getting-started.html—6 pages, Aug. 6, 2012.
Sample Page of iGoogle with Brief Overview of Features—1 page.

* cited by examiner

Primary Examiner — Cam-Linh Nguyen
(74) Attorney, Agent, or Firm — Fulwider Patton LLP

(57) ABSTRACT

A system has a processor and tangible, non-transistory media that stores a program that when executed by the processor is configured to perform operations. The system receives a request from a requesting user to reconfigure a search screen on a display, adds at least one search window to the search screen; receives a plurality of search requests from the search screen, and performs a plurality of searches to perform a separate search resulting in separate search results for each of the search requests provided by the requesting user. Each of the search results is displayed on a separate frame on a display. Other embodiments include operations other than searches.

21 Claims, 23 Drawing Sheets

SYSTEM FOR MULTIPLE TASKS ON A DISPLAY

CROSS-REFERENCES TO RELATED APPLICATIONS

This application claims priority from U.S. Provisional Application No. 61/473,007, filed Apr. 7, 2011 and 61/473,050, filed Apr. 7, 2011, both incorporated by reference in their entirety.

BACKGROUND OF THE INVENTION

In a web browser, a user inputs commands for controlling what is displayed on the web page. To run multiple applications on a single web page, the web page can be divided into different windows or frames, each of which displays information from a different application. Each window acts independently of the other windows, and typically has one or more scroll bars for each frame, with which the user separately scrolls what is displayed in each frame. The display is therefore not seamless, as it is divided by various separate, independently framed windows, scroll bars or the like. Also, only one frame is active at a time.

There is a need in the art for a multi-browsing experience within a single environment, in which the screen is not divided into separate independently framed windows' but on which multiple applications, such as two or more independent searches or other combinations of applications or websites can be displayed.

SUMMARY OF THE INVENTION

One specific embodiment of the invention relates to a system that has a processor and tangible, non-transistory media that stores a program that when executed by the processor is configured to perform operations. In one embodiment relating to searches, the system receives a request from a requesting user to reconfigure a search screen on a display. The system adds at least one search window to the search screen; The system receives a plurality of search requests from the search screen, and performs a plurality of searches to perform a separate search resulting in separate search results for each of the search requests provided by the requesting user. Each of the search results is displayed on a separate frame on a display.

Particular embodiments of the invention may have specific features. In one embodiment, each separate frame is displayed as a column on the screen. The columns may be side-by-side, for example, for convenient comparison. The system may further include receiving a choice of a search engine or a plurality of search engines by the requesting user, and utilizing the search engine(s) specified by the requesting user to perform one or more searches.

The system may include receiving a request to increase the number of search windows on the screen and, in response, increasing the number of search windows displayed on the screen. The system may also include receiving a request to decrease the number of search windows on the screen and, in response, decreasing the number of search windows displayed on the screen. Sponsored links or other information may be displayed in conjunction with the display of search results. The system may also include receiving a request to reduce the number of columns of search results and, in response, reducing the number of columns of search results.

The system may also include receiving a request to reduce the display of sponsored ads and, in response, reducing the display of sponsored ads.

In one embodiment, the system includes a plug-in for a browser, wherein the plug-in configures the browser for use in the system.

The system may be specially configured to display search results on the screen of a mobile device, such as a smart phone, a tablet, a PDA or the like. The system may, for example, display a plurality of search results for a plurality of search strings on the screen of a mobile device, wherein at least one set of search results is initially collapsed until expanded by the user. The search results may be displayed, for example, in horizontal frames extending across at least a portion of the display. In one embodiment, the system receives a request from the user to scroll through search results, and the search results are correspondingly scrolled. Another alternative is that the system may receive a request, from the end user for example, to move the boundary of a search result frame and, in response, the boundary of the search result frame is accordingly moved.

The system may receive an indication that the cursor has rolled over a search result, and in response the system displays a preview of the search result. As another alternative, the system may includes pagination with the search results or other content to be displayed, to display multiple pages of search results or other content within a frame. In another alternative, the system may include receiving a request to display the destination of a search result within the frame, and replacing the list of search results with a destination page.

Although one embodiment relates to display of search results, various other embodiments may include the display of other content. As one non-limiting example, a feed from a social media site may be displayed in one column or row on the display, for example, while feeds from other sites may be displayed in adjacent columns or rows. Other variations are possible, such as results from a plurality of travel-related sites displayed adjacent to one another, or results from shopping sites in order to compare prices or other aspects of goods for sale. In one embodiment, the user may select from amongst various sites and/or applications from pull-down menus associated with a search bar or otherwise provided by the system.

The aforementioned features may be combined in a variety of different ways to form different embodiments. It should also be understood that the foregoing Summary is not a complete description of the inventive features and aspects of the invention. Other features and advantages of the present invention will become more apparent from the following Detailed Description, taken in conjunction with the drawings, and from the claims.

BRIEF DESCRIPTION OF THE DRAWINGS

FIG. 2 illustrates a display in which a second window has been opened in which to enter search terms for a second search;

FIG. 9 illustrates the display of FIG. 7 in which search results are independently displayed for each of the two search strings of FIG. 8;

Figure 15:
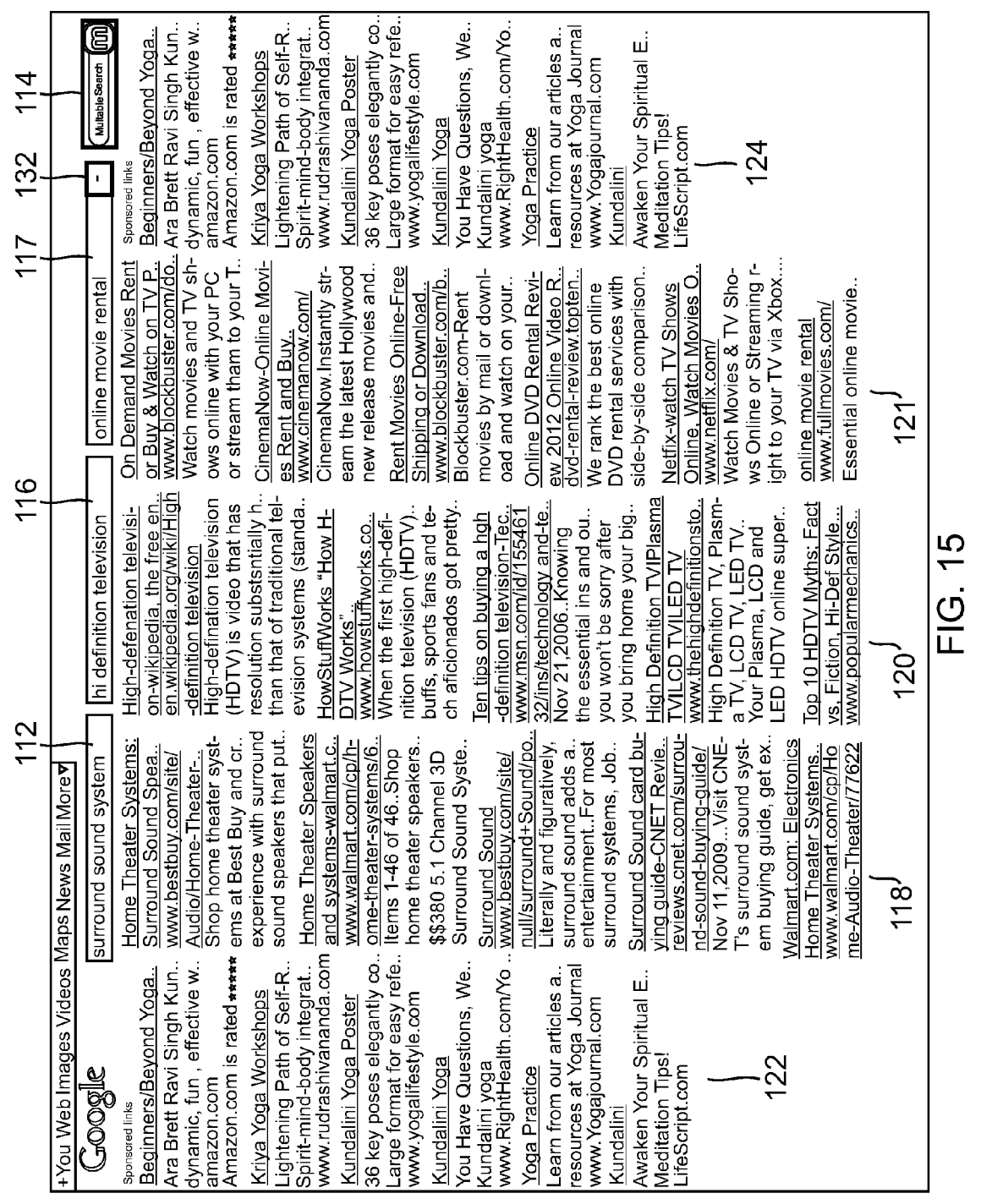

FIG. 15 illustrates search results and sponsored ads that appear after the search has been conducted;

Figure 16:
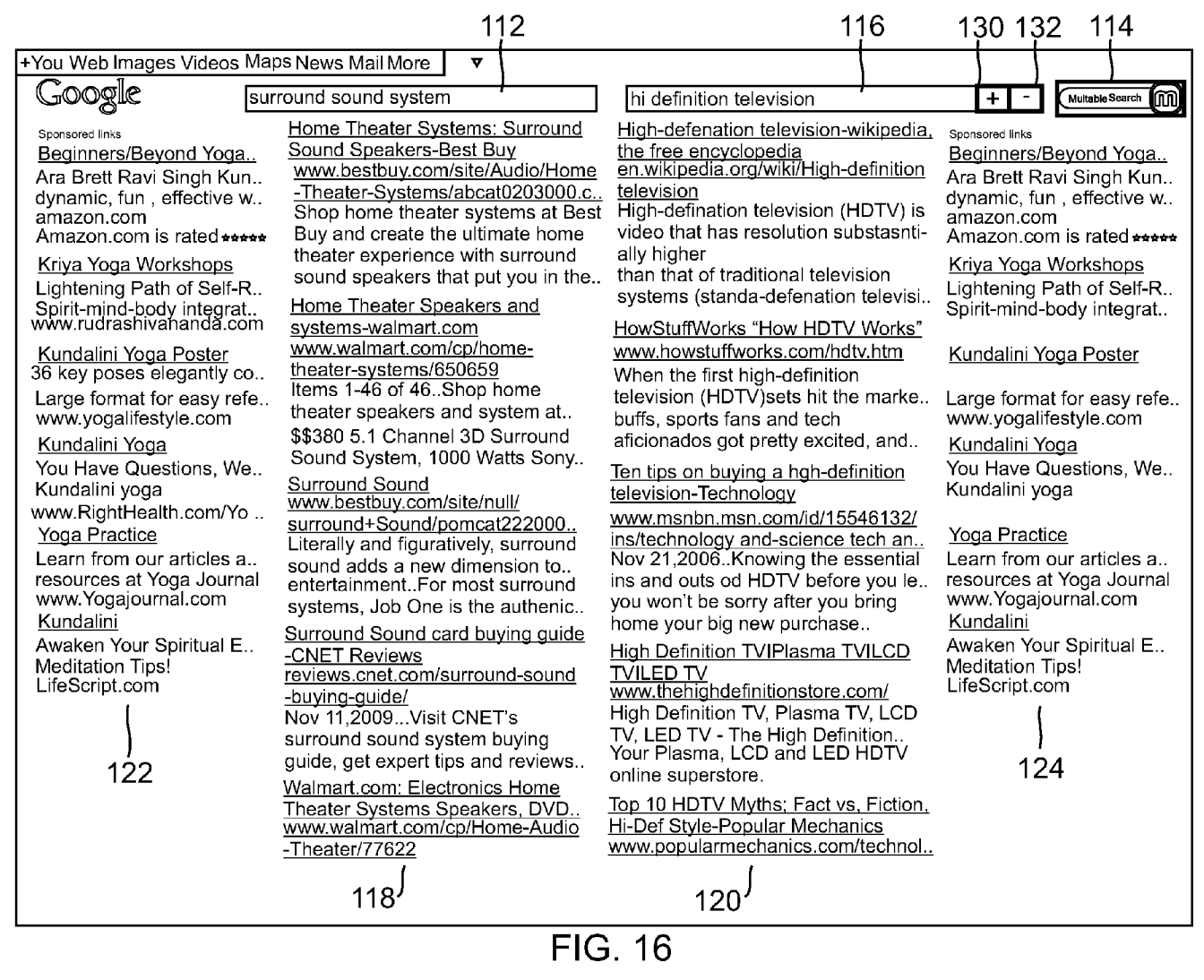

FIG. 16 illustrates a results screen with only two search windows;

DETAILED DESCRIPTION OF THE PREFERRED EMBODIMENTS

The present invention relates to an online multi-tasking application that provides users the ability to have concurrent experiences on the Internet in real time. This application aggregates two or more simultaneous, independent live feeds or streams into a single, frameless window, in side-by-side fashion, allowing users to seamlessly engage in multiple activities without having to re-open, maximize, 'activate' or toggle back and forth between windows. A unified display thus includes data of more than one application or website, with the data of each displayed in a predetermined data location on the screen.

In one example, on Internet search sites (such as Google, Bing, Yahoo!, etc.), the present invention turns an existing, single-action page into a multi-use application, and allows for side-by-side comparisons, so that users can multi-task in real-time.

In one embodiment, upon clicking an onscreen button, an additional search entry field appears on the page, allowing the user to enter two distinct, separate search terms, and thus execute two simultaneous, real-time searches. Upon activating the enter command, the page returns search results for both queries in a side-by-side cohesive display. A multiple experience within a frameless window display within the existing page opens, allowing a side-by-side display of search results, which includes two or more real-time searches.

Figure 1:
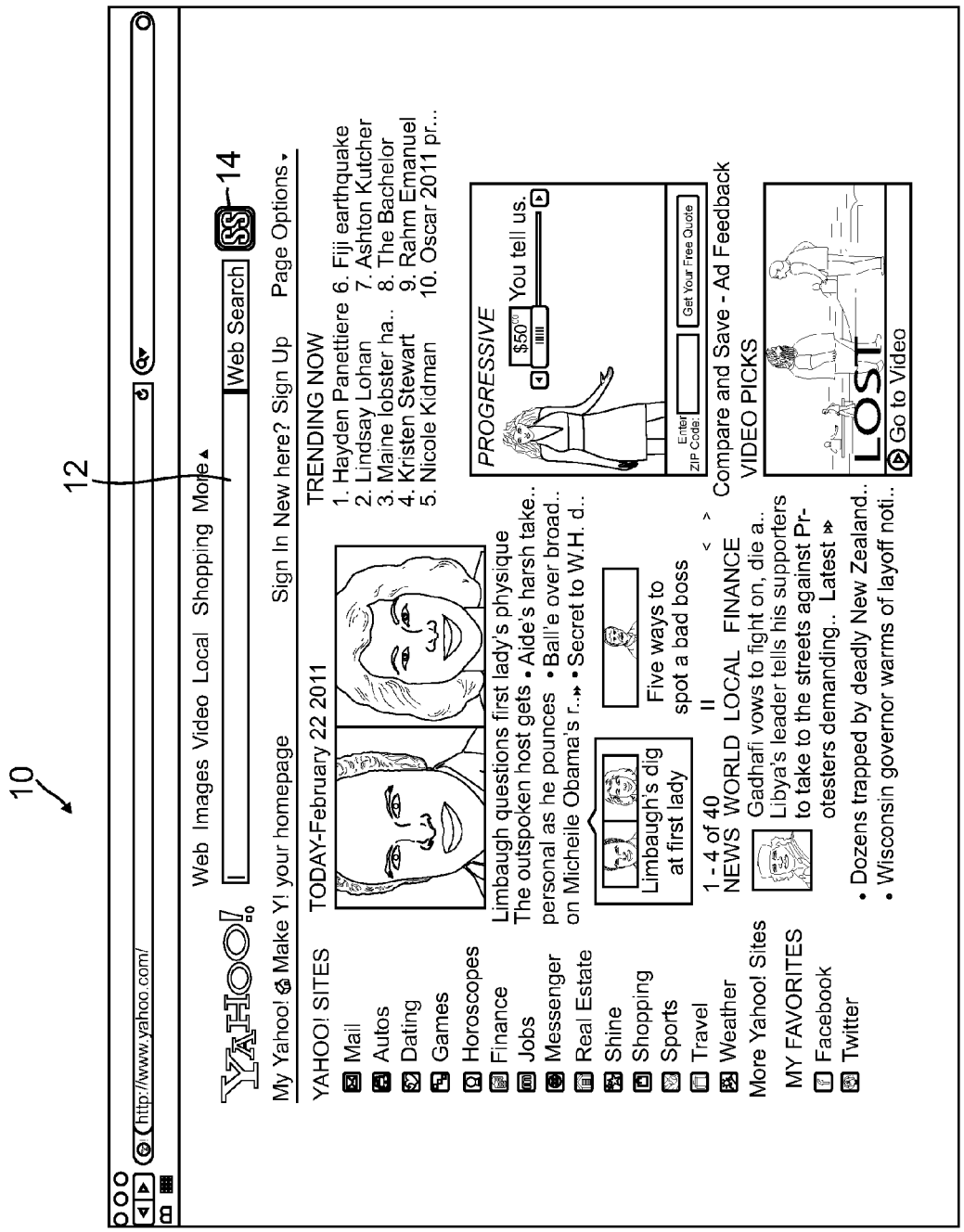
FIG. 1 illustrates a display having a single window in which to enter search terms and a button with which to initiate a second search on the same display.
Figure 2:
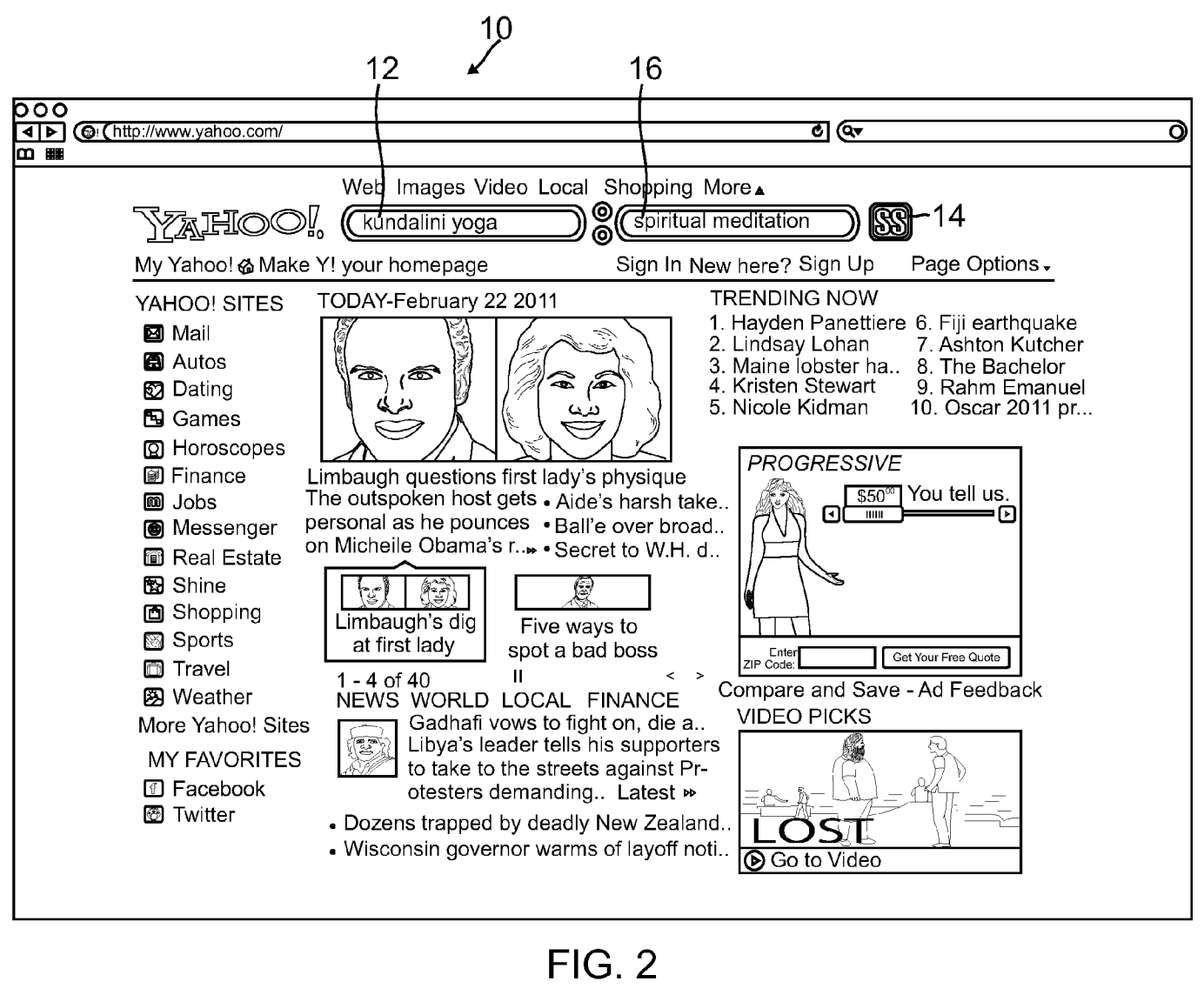
Figure 3:
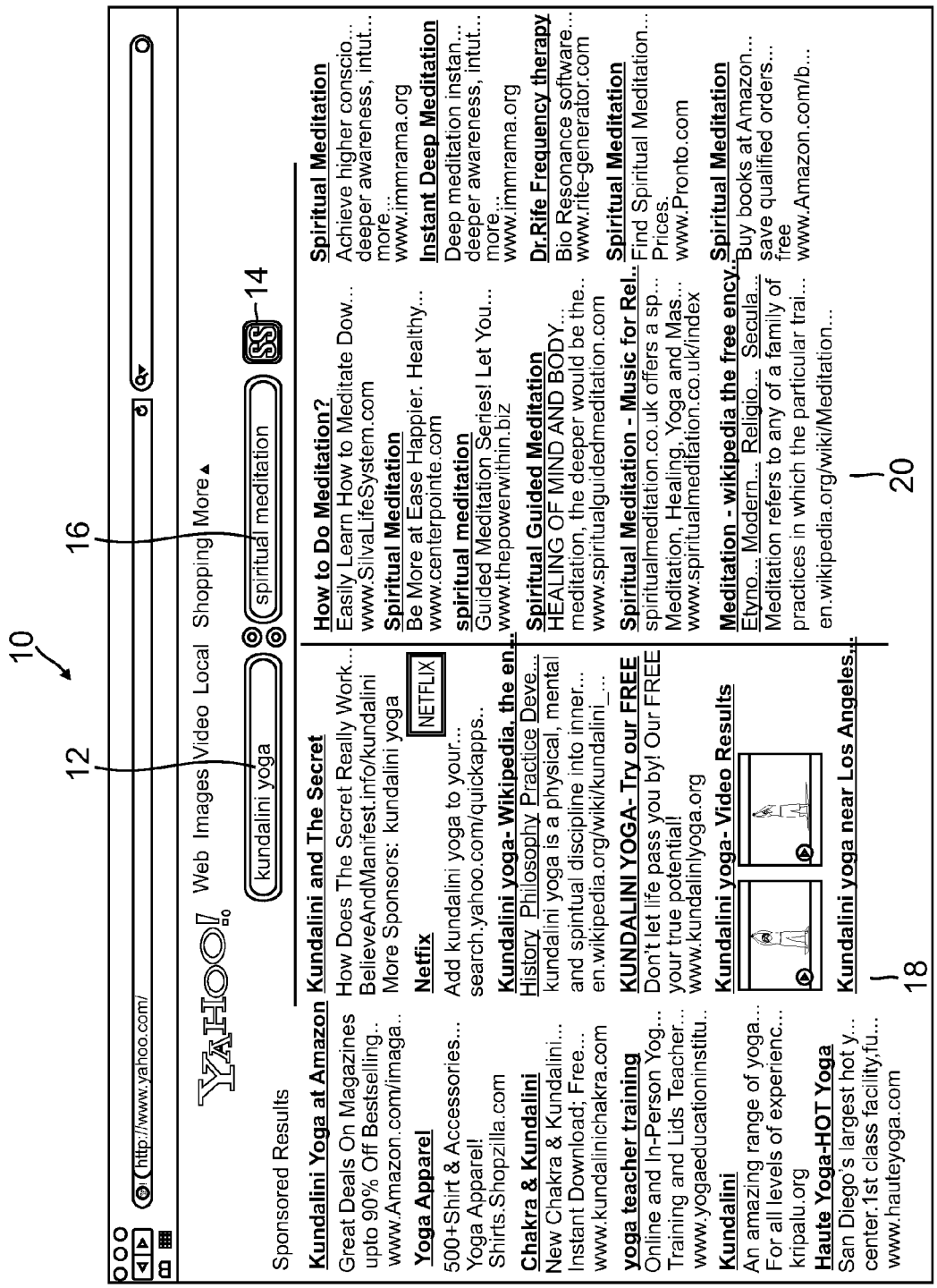
FIG. 3 illustrates a frameless display having two windows in which search terms have been entered and two independent sets of search results displayed on the display.

For instance, FIG. 1 illustrates a display 10 having a single window 12 in which to enter search terms and a button 14 with which to initiate a second search on the same display. FIG. 2 illustrates display 10 in which button 14 has been clicked by the user and a second window 16 has been opened in which to enter search terms for a second search. FIG. 3 illustrates frameless display 10 having two windows 12, 16 in which search terms have been entered and two independent sets of search results 18, 20 displayed on the display.

Figure 4:
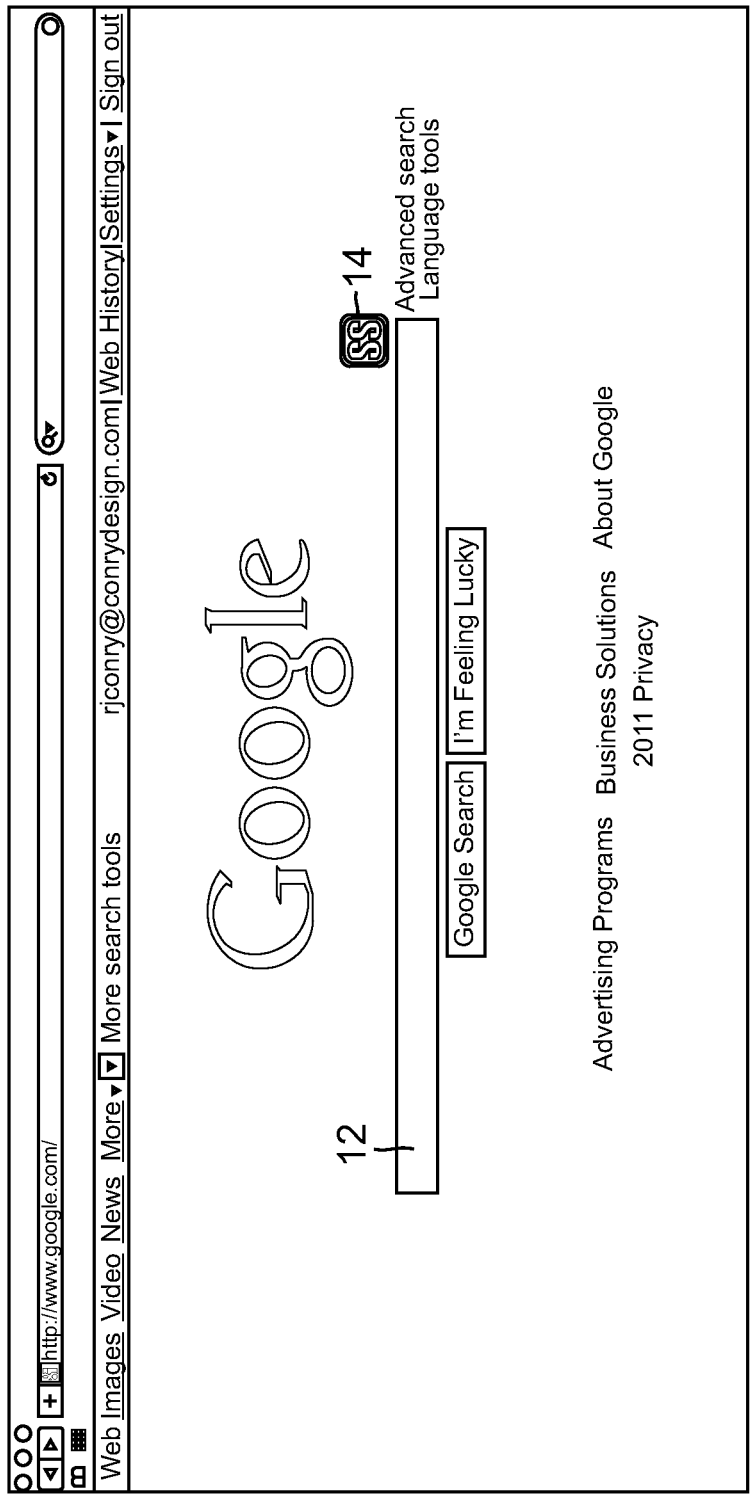
FIG. 4 illustrates an alternative display having a single search window and an onscreen button with which to initiate a second search on the same display.
Figure 5:
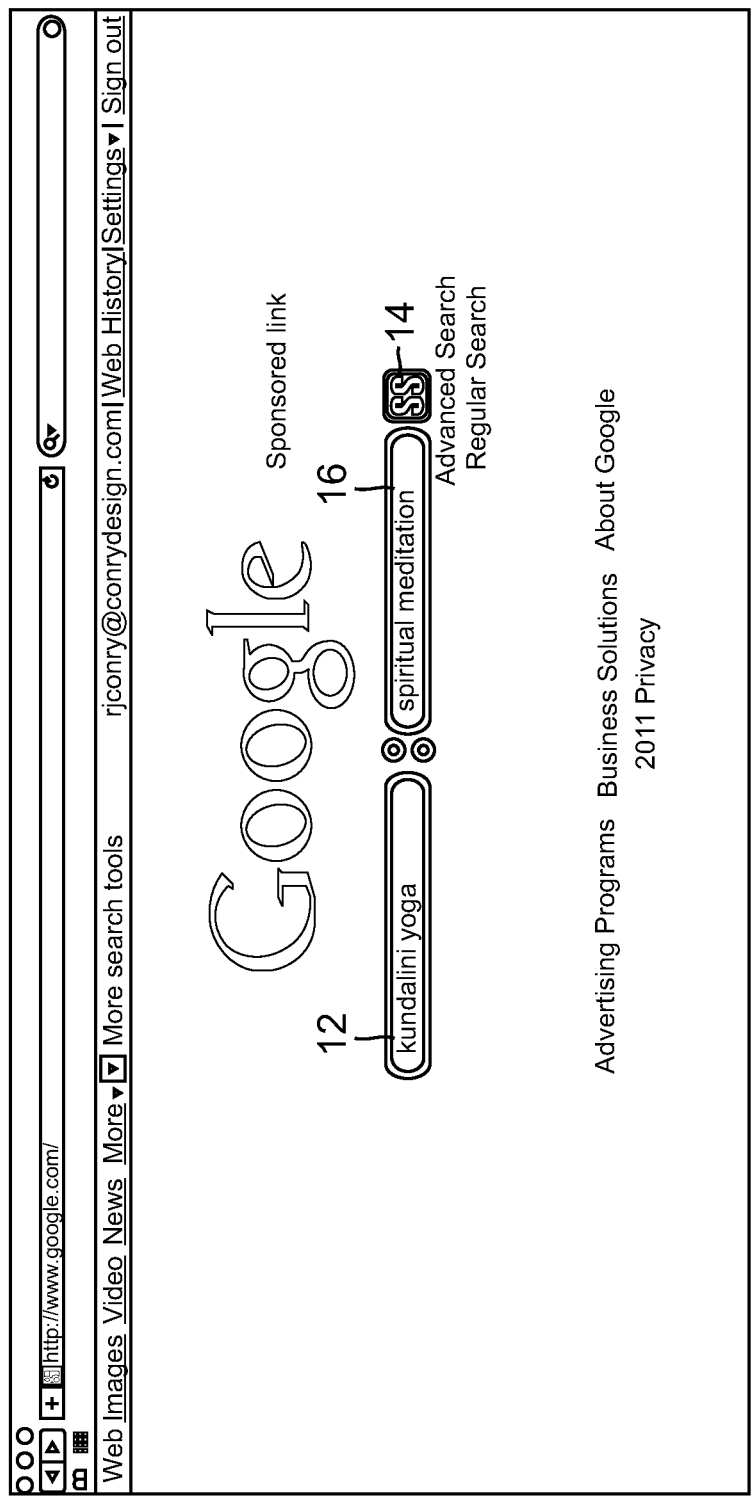
FIG. 5 illustrates the display of FIG. 4 in which the user has clicked on the button to open a second search window.
Figure 6:
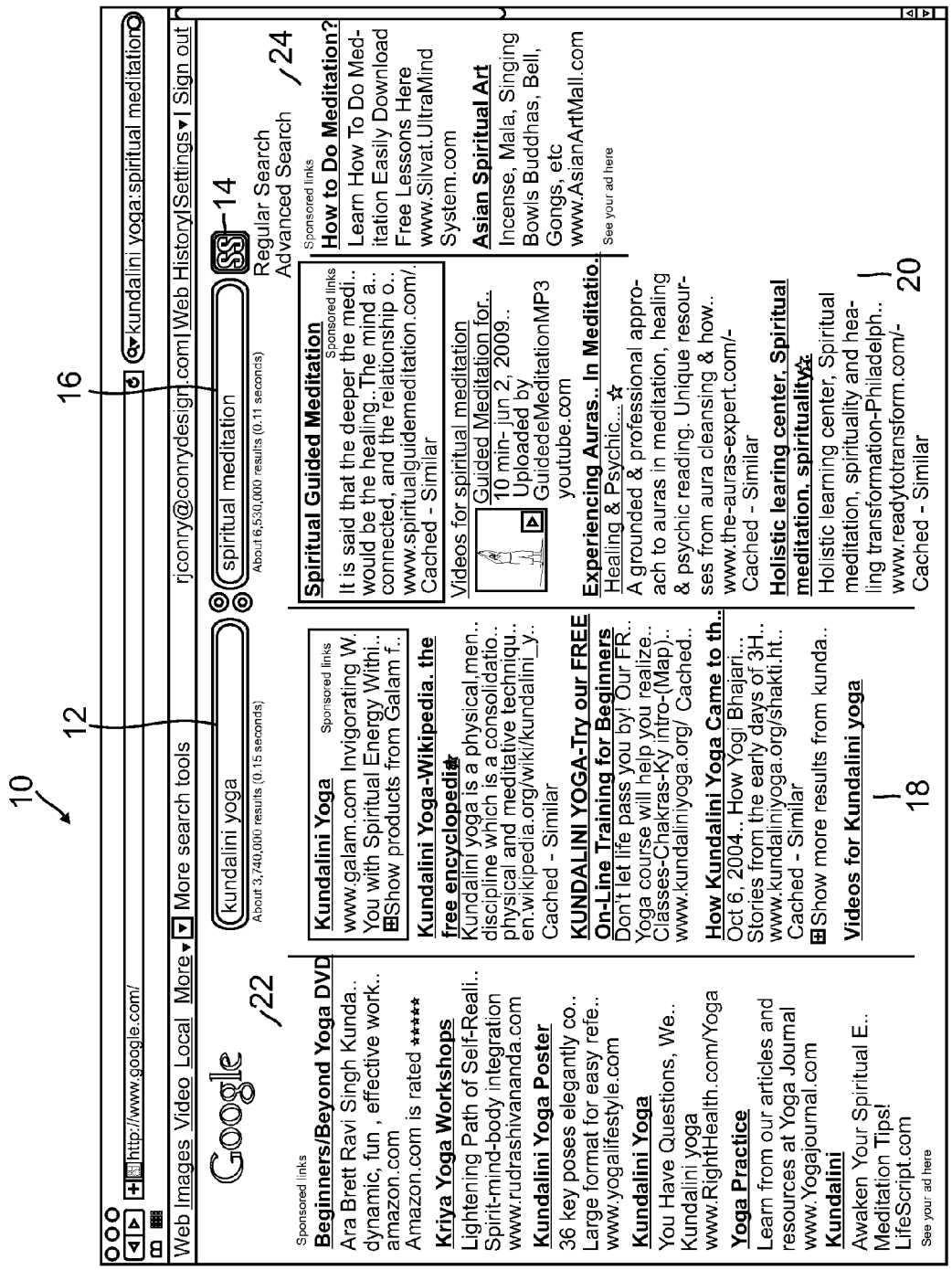
FIG. 6 illustrates the display of FIG. 5 in which the user has conducted two independent searches on a single, frameless screen.

FIG. 4 illustrates an alternative display having a single search window 12 and an onscreen button 14 with which to initiate a second search on the same display. FIG. 5 illustrates the display of FIG. 4 in which the user has clicked on the button 14 to open a second search window 16. FIG. 6 illustrates the display of FIG. 5 in which the user has conducted two independent searches on the single, frameless display 10, with the search results 18, 20 of each search displayed side-by-side. Advertisements corresponding to each search are displayed in columns 22 and 24, respectively.

Figure 7:
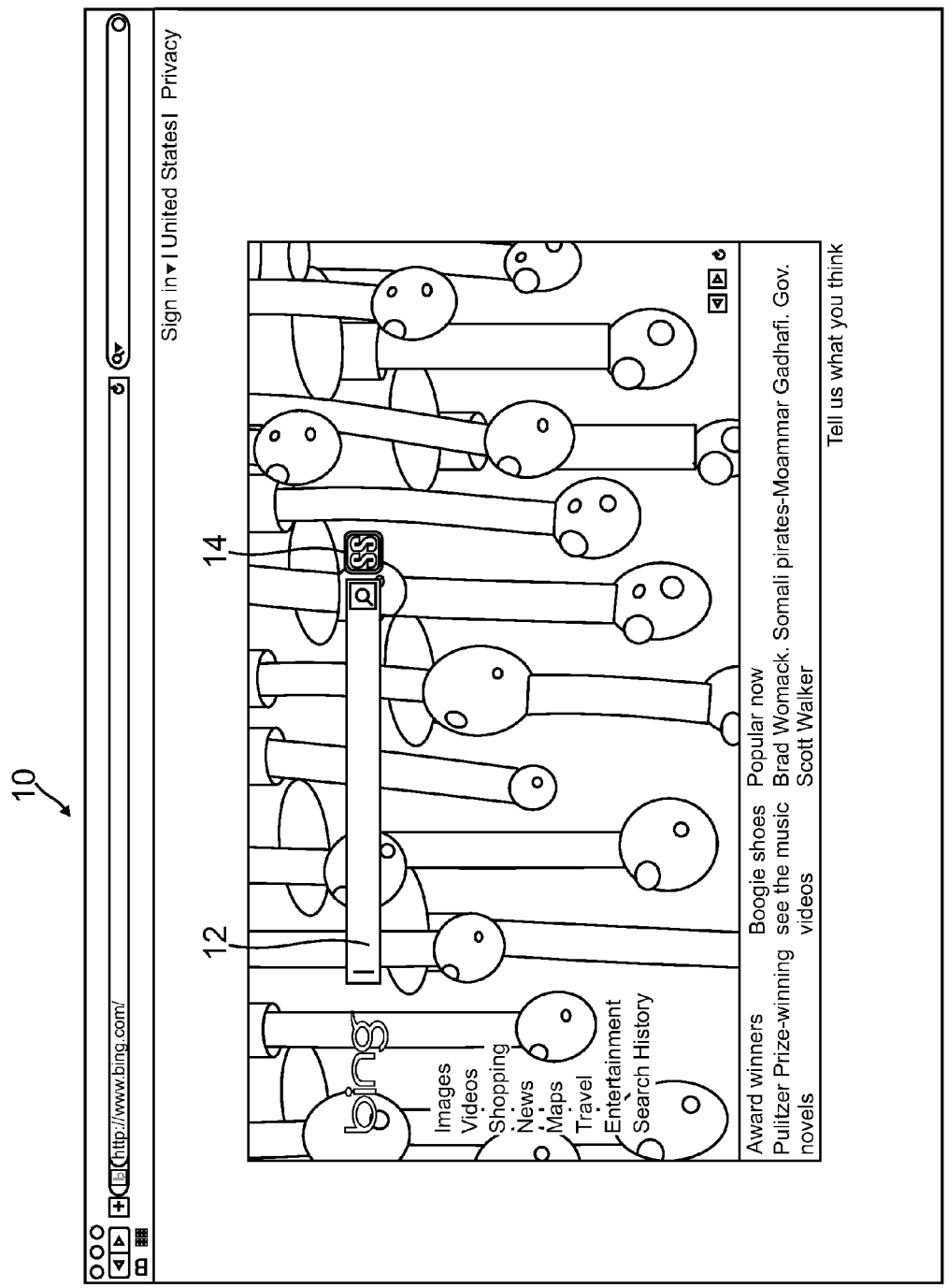
FIG. 7 illustrates an alternative display having a single search window and an onscreen button with which to initiate a second search on the same display.
Figure 8:
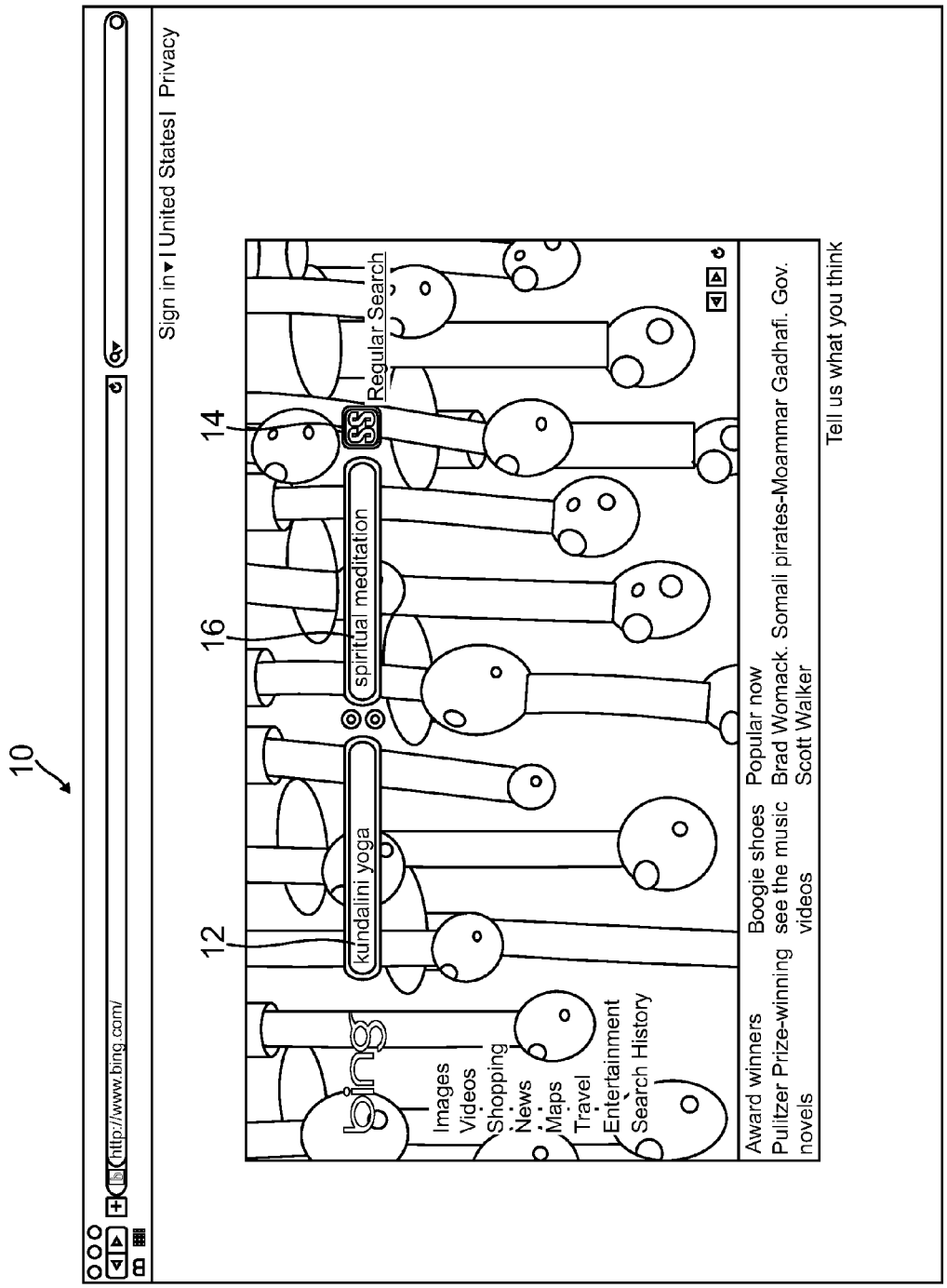
FIG. 8 illustrates the display of FIG. 7 in which the user has entered search terms for two independent searches on a single, frameless screen.
Figure 9:
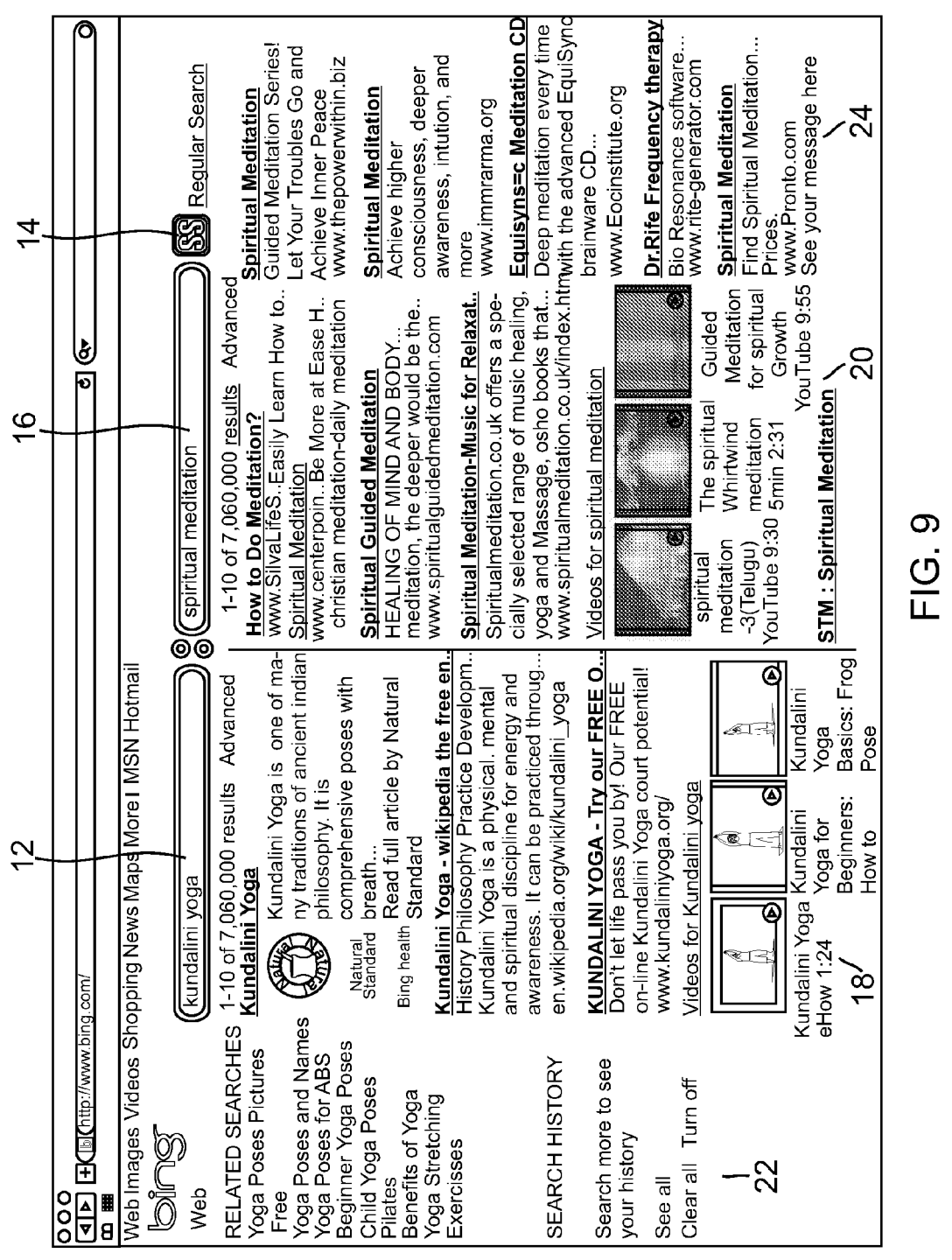

FIG. 7 illustrates an alternative display having a single search window and an onscreen button with which to initiate a second search on the same display. FIG. 8 illustrates the display of FIG. 7 in which the user has entered search terms for two independent searches on a single, frameless screen. FIG. 9 illustrates the display of FIG. 7 in which search results are independently displayed for each of the two search strings of FIG. 8.

Figure 10:
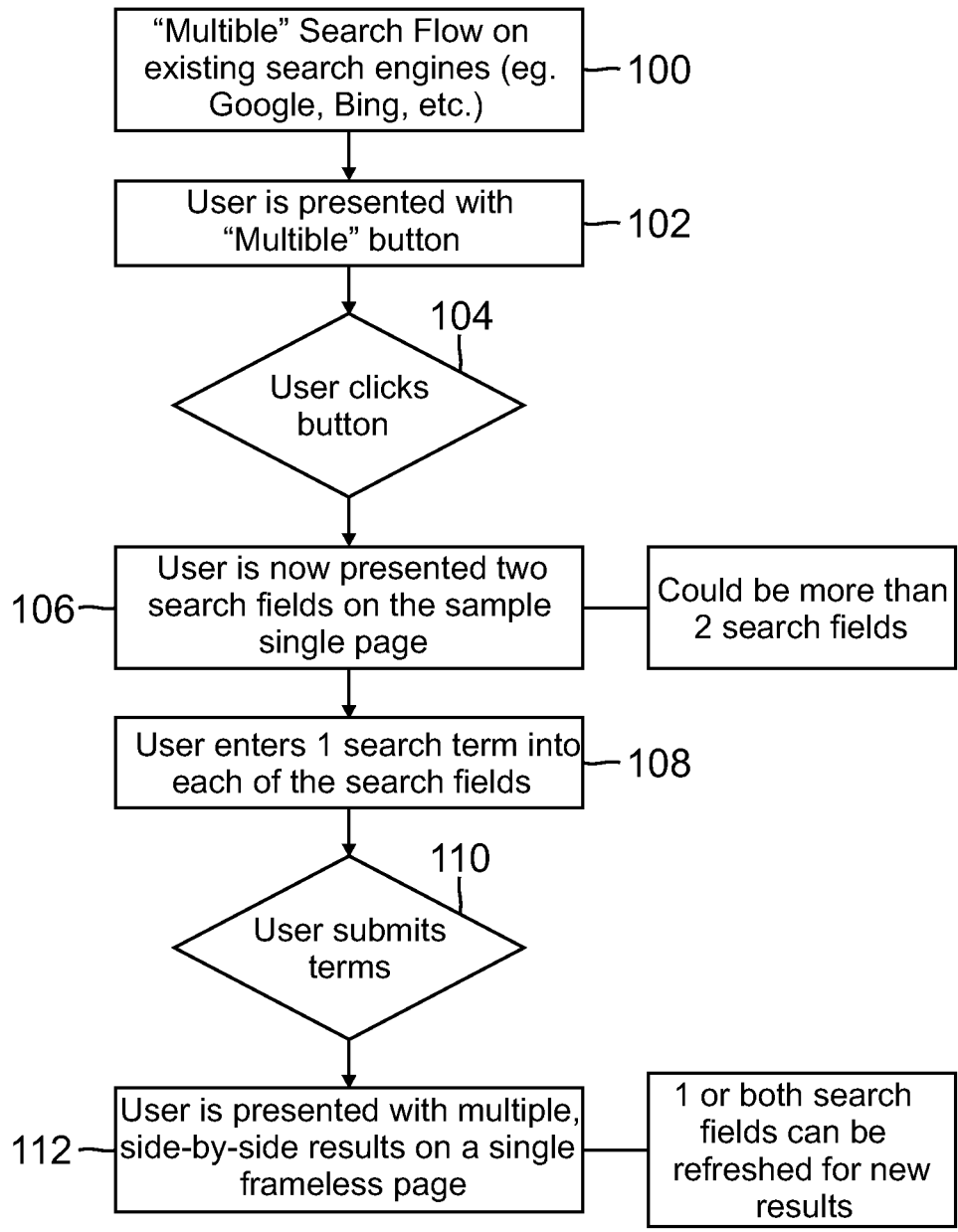
FIG. 10 is a flow chart illustrating the flow from the user's perspective of the present system.
Figure 11:
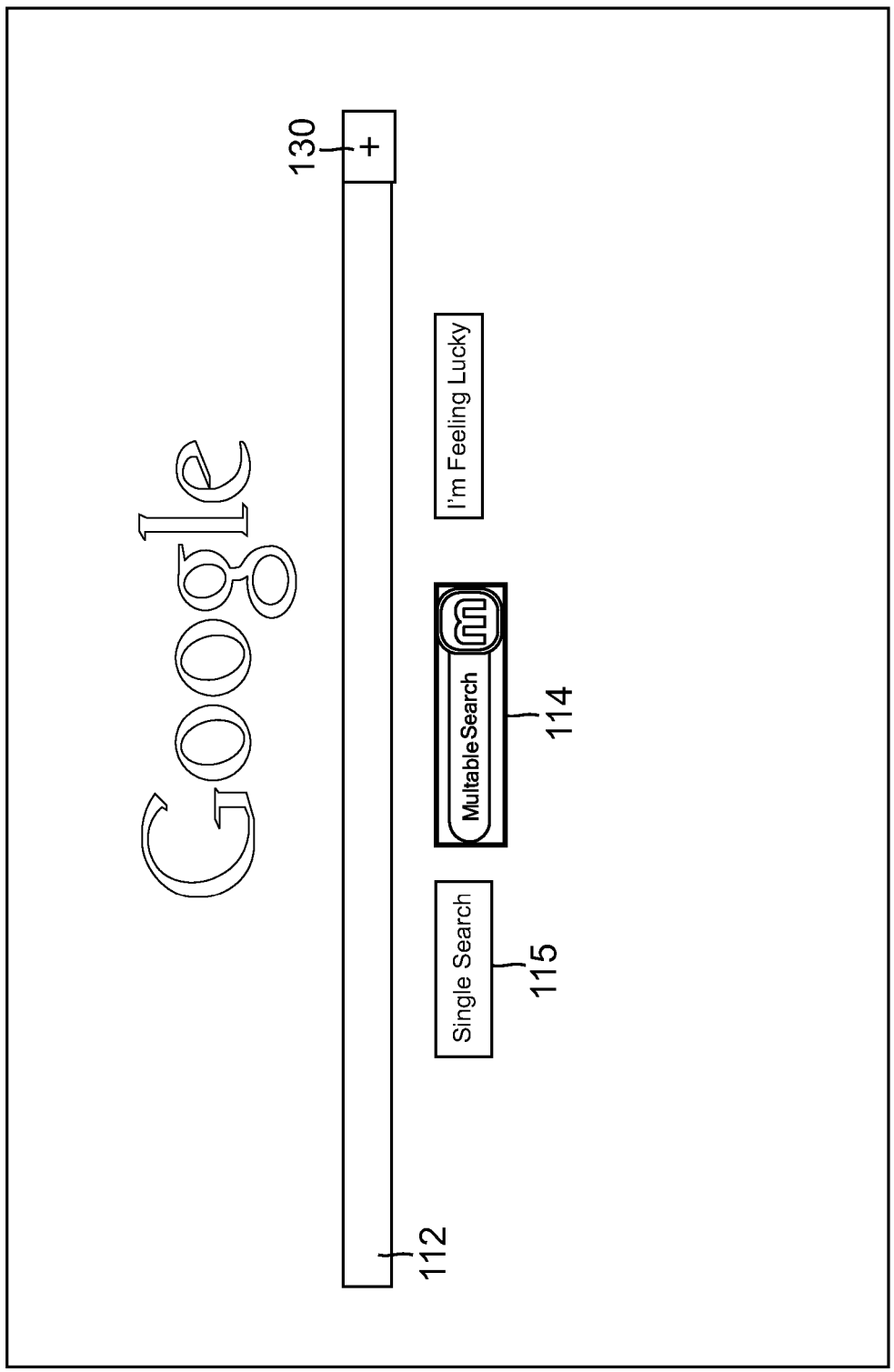
FIG. 11 illustrates an alternative embodiment search screen having a single search window.
Figure 12:
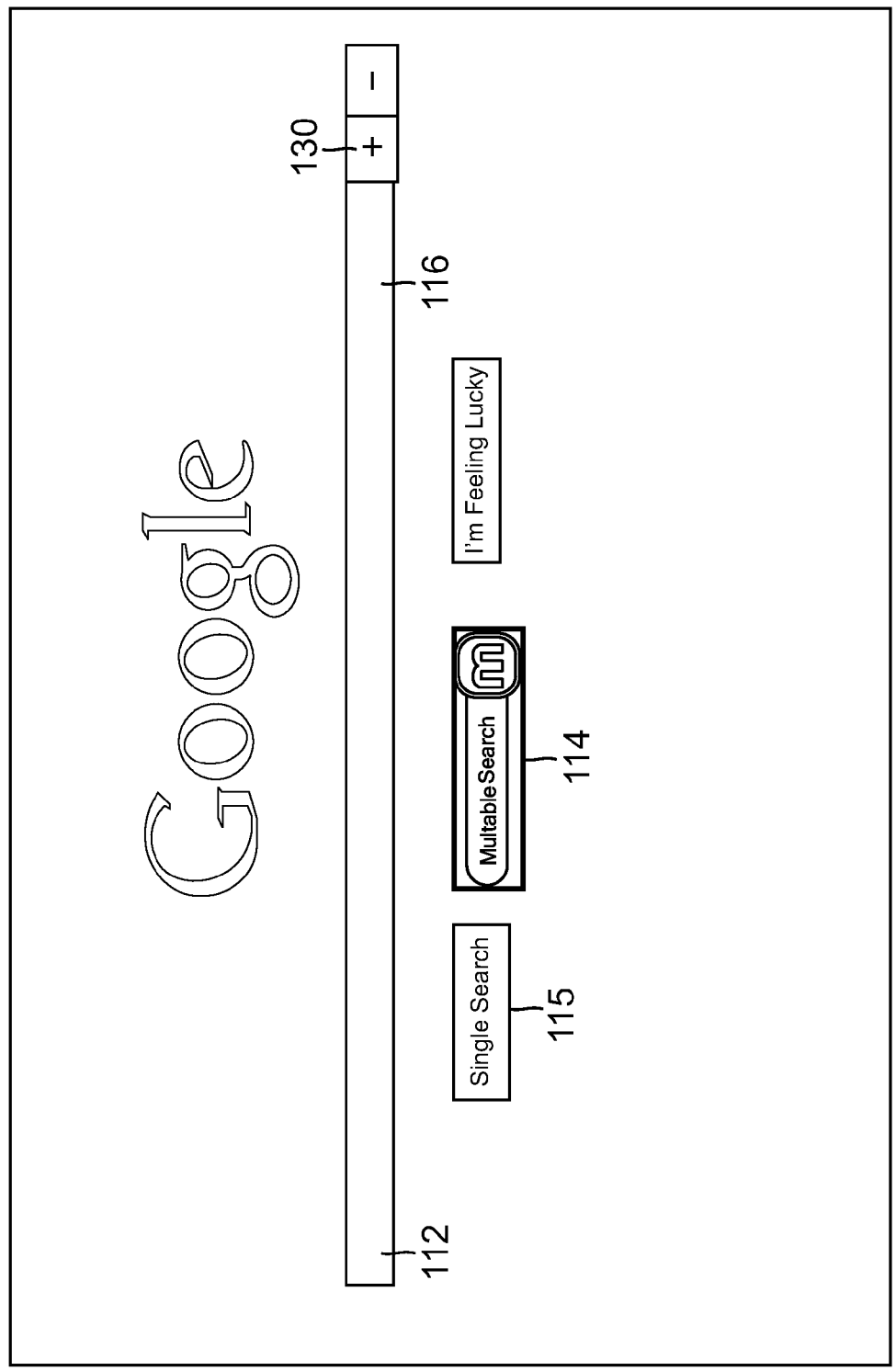
FIG. 12 illustrates the embodiment of FIG. 11 expanded to two search windows.
Figure 13:
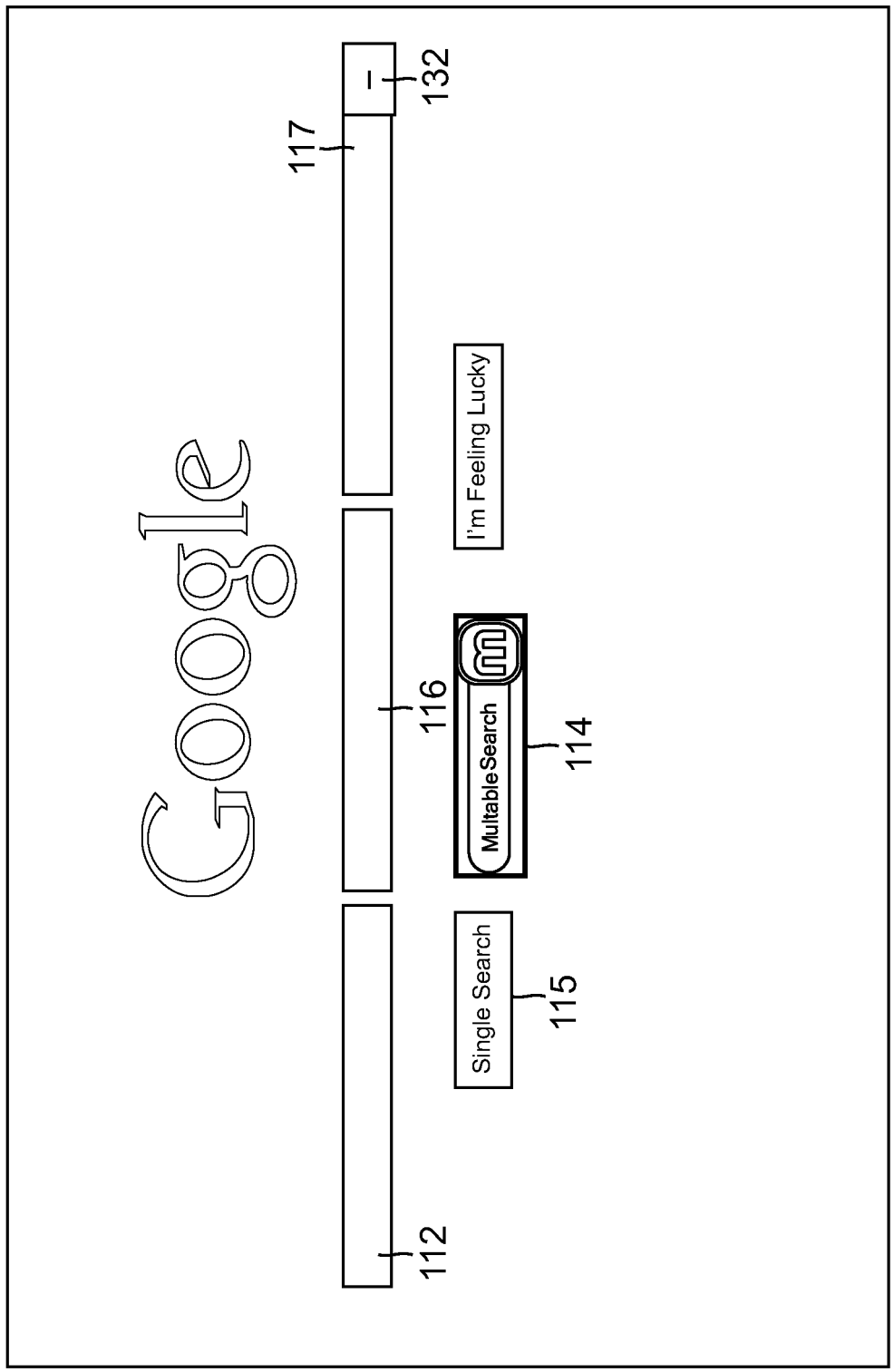
FIG. 13 illustrates the embodiment of FIG. 11 expanded to three search windows.
Figure 14:
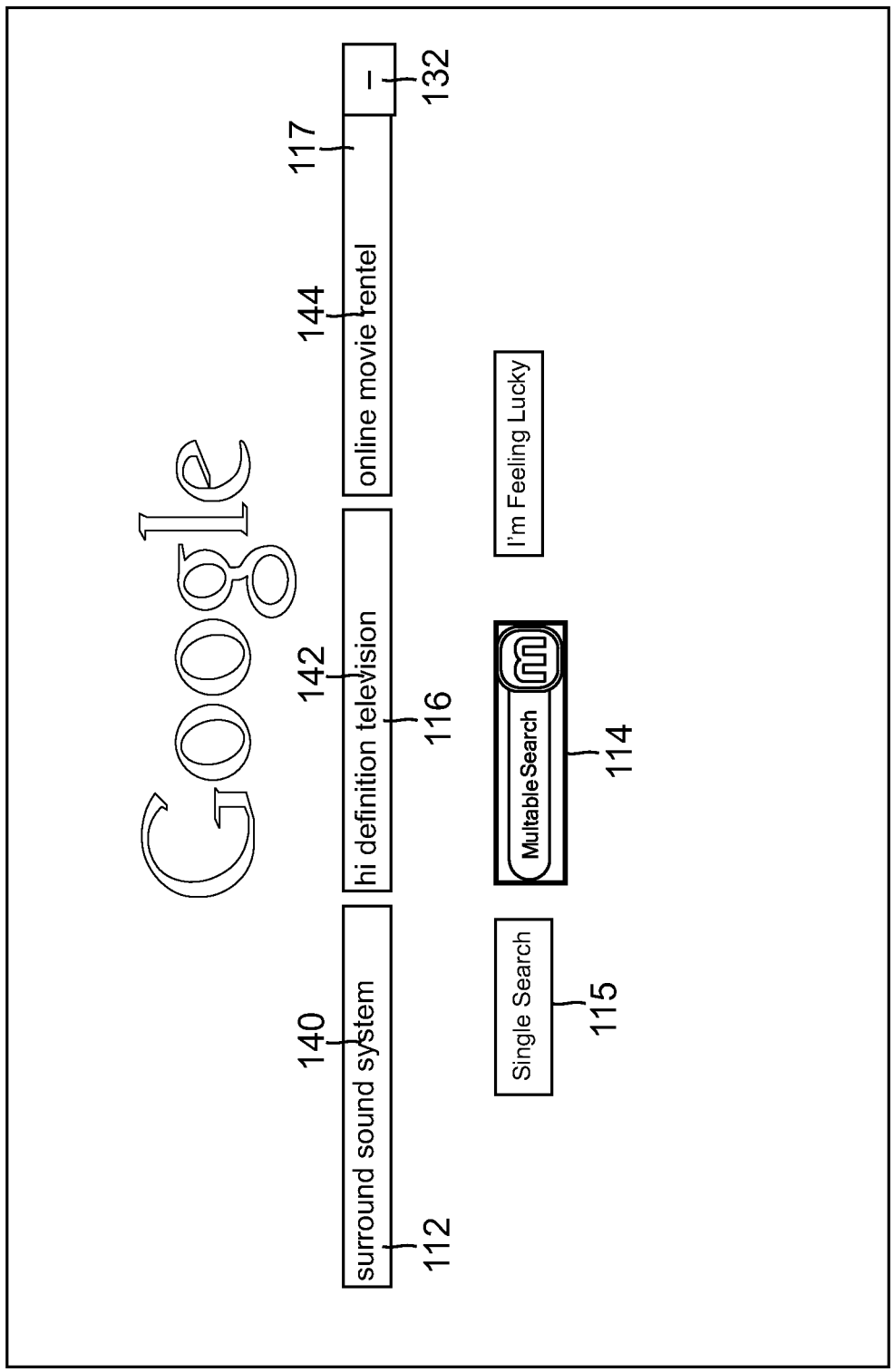
FIG. 14 illustrates the configuration of FIG. 13 with search terms entered in each of the three search windows.
Figure 17:
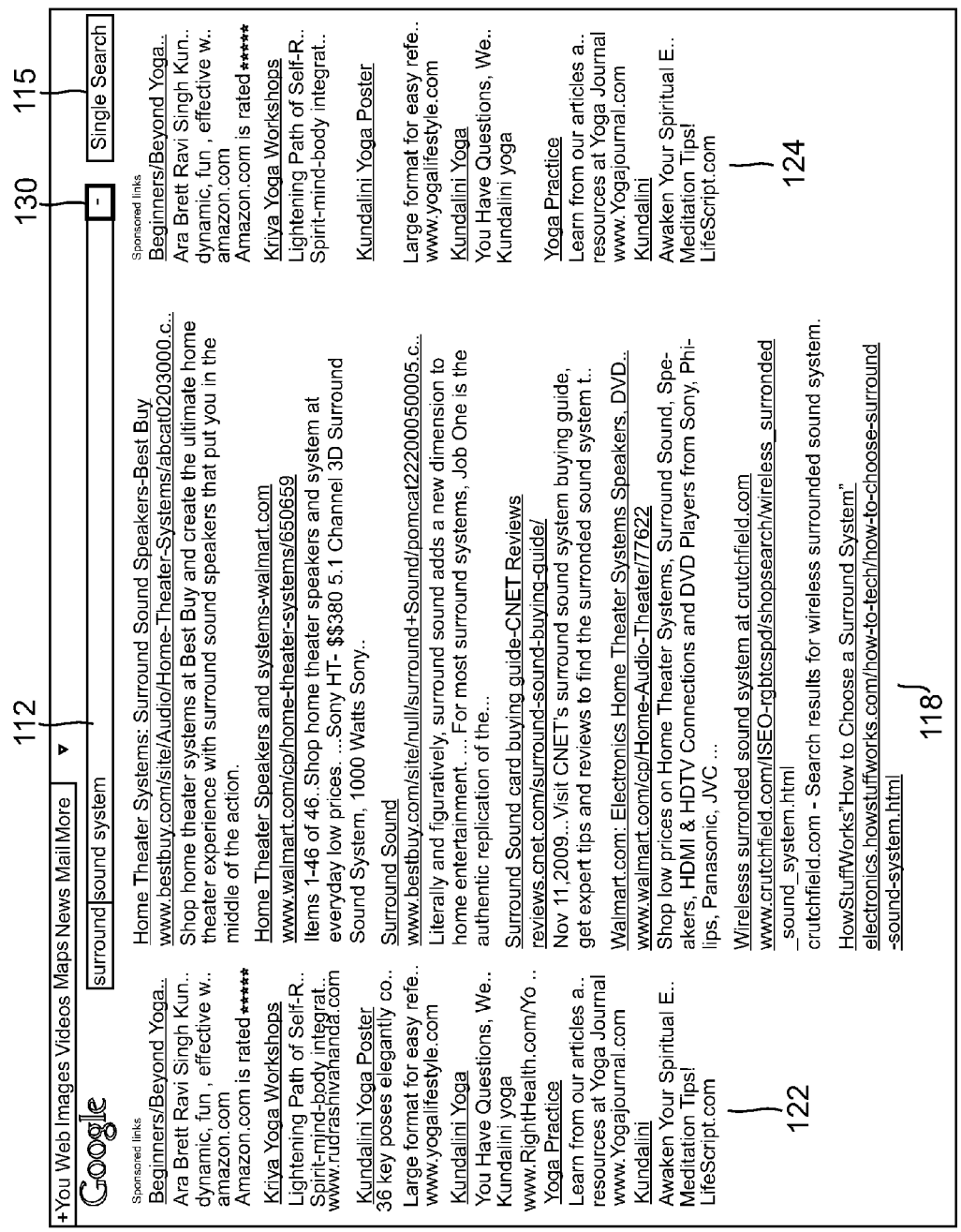
FIG. 17 illustrates a results screen with only one search window.

FIG. 10 is a flow chart illustrating the flow from the user's perspective of the present system as relating to conducting searches with search engines. Step 100 initiates a process termed herein under the "Multable" trademark. In Step 102, the user is presented with an onscreen button, such as button 14 in FIG. 1. When the user clicks the button in Step 104, the user is presented with two search fields 106 on the single display. Alternatively, the user may be presented with more than two search fields, as different embodiments of the present invention may include more than two search fields.

The user now enters a search term into each of the search fields, at Step 108, and submits the terms, typically one at a time, at Step 110. Once the search terms have been entered, the user is presented with multiple, side-by-side search results on a single frameless page at Step 112.

Another embodiment includes a widget or plug-in function, that allows a user to populate the widget with feeds from any two sites in side-by-side fashion. For illustration purposes, the following independent feeds could populate the widget according to this embodiment of the invention—Facebook/Search, Twitter/Facebook, Ancestry.com/Wikipedia, Bing/Google, eBay/Amazon, Yahoo! Finance/BankofAmerica.

The present invention is not limited to Internet searching. Two or more other applications can be run simultaneously. As non-limiting examples, a social media site may be run simultaneously with other sites, such as a Facebook friend feed or a game. The feed from the social media site may be displayed in one column or row on the display, for example, while the feeds from other sites may be displayed in adjacent columns or rows. Other variations are possible, such as results from a plurality of travel-related sites displayed adjacent to one another, or results from shopping sites in order to compare prices or other aspects of goods for sale. In one embodiment, the user may select from amongst various sites and/or applications from pull-down menus associated with a search bar or otherwise provided on the site.

As will be explained in further detail below, the onscreen button may be located at any of a variety of locations on a web page, such as in a user's navigation bar, on a Facebook page, on the main portion of the display, or elsewhere, and represents the ability to multi-task in real time with two or more simultaneous, side-by-side activities.

This dual search functionality allows for increased search ad revenue. For example:

It allows sites to incrementally sell more ads on a single page. As a non-limiting example, if each side of the search is worth 65% of a full page, combining the two may yield 130% of current revenue, thus resulting in 30% increased revenue.

Multi-word keyword purchase—an advertiser can purchase multiple search terms, and if a user uses these in his/her side-by-side search, it triggers a takeover of the top search spots on each side, then combines into a single 'banner' spanning both sides (e.g. across the top of the screen or other arrangement, as desired by the developer).

In another embodiment, the search strings entered into each search window are used to determine what advertisements will be displayed on the screen. That is, in an ad keyword environment, ad keywords are derived from each of the search strings, when possible. Consequently, advertisements may optionally be displayed on the screen based upon an aggregation of entered search strings.

The present invention can operate within a multi-window or multi-frame environment. For example, considering the popular iGoogle application, the iGoogle application acts in completely separate spaces or real estate on the page, and there is no association between them. Each window or application is individually framed and separate from the others, operating completely independently within an independent frame or environment. iGoogle acts as a dashboard, with each window acting as a separate experience in different regions or quadrants of the page. In contrast, the present invention relates to a multi-browsing experience within a single environment.

In one embodiment, the present invention can operate as one of the applications within an iGoogle or similar screen, allowing the user to multi-task within one of the windows rather than toggling back and forth between windows to execute two simultaneous experiences.

Generally, embodiments of the present invention relate to generating a frameless display. Display configurations and screen layout are typically pre-defined, with areas of the display configured to display output from different applications. For example, in the figures presented, when the user clicks on the onscreen button 14, the format of the display becomes the pre-defined format in which output (such as search results from multiple searches) is displayed in corresponding pre-determined areas of the display.

It is noted that the onscreen button 14, which may be located at any of a variety of locations on the display, permits the user to toggle between a normal first mode and a second, multi-application mode. So, for example, if the user wishes to conduct a normal internet search, the display remains in the default first mode. If the user then wishes to switch to a dual internet search mode (e.g. FIG. 2), the user simply clicks on the button 14. To go back to the first, normal mode, the user clicks again on the button 14. Alternatively, the button can be configured to switch between a variety of different modes. For example, a first mode can be the default, normal display mode. A second mode can be a two-application mode, while a third mode can be a three-application mode, etc. In these particular embodiments, the user can therefore use the button 14 to switch between different display modes, as desired.

It is expected that in most embodiments, the layout of the display will be pre-determined, such that the user does not have an opportunity to alter the layout of the various modes. However, in an alternative embodiment, the user may be permitted—through the use of an "options" menu or the like—to customize the layout of the display in a particular mode. For example, the user may be enabled to select between a display format in which two applications run side-by-side, or a display format in which two applications run one-atop-the-other. Further, in most embodiments, it will be predetermined which applications run together in the multi-application mode. However, in select embodiments, the user may be enabled to select or to specify which applications are to be run concurrently (e.g. Google/Google, Google/Facebook, Google/Ebay, Wikipedia/Orbitz, etc.).

Considering another embodiment that is illustrated in FIGS. 11-17, the user is initially presented with a single search window 112 and a "+" button 130, which is an add-on or supplement to the existing search screen. Clicking on the "+" button 130 opens a second search field 116. Clicking on the "+" button 130 again opens a third search field 117. A different search term 140, 142, 144 may be entered into each search field 112, 116, and 117. Clicking on the "Multable Seach" button 114 performs searches on all three search terms 140, 142 and 144. The search results are displayed in iframes, with an iframe dedicated to search results for each search term. Multiple comparisons within the same active window are thereby facilitated.

Sponsored links 122 and 124 are displayed on either side of the screen. In an example in which there are three search windows, the two columns of sponsored links result in five iframes 118, 120, 121, 122 and 124 on the webpage. But to make more room on the screen for search results, a single column of sponsored links or no sponsored links at all may optionally be displayed. As a further option, scroll bars may be added to one or more iframes to facilitate convenient scrolling through search results. Pagination may then be added within each frame, corresponding to the multiple search result screens that the search engine would normally display.

When more than one iframe is open, a "−" button 132 may be displayed. Clicking on the "−" button 132 once reduces the number of search windows by one. So, for example, if the screen displays three search windows 112, 116, 117, clicking on the "−" button 132 reduces the number to two search windows 112 and 116. Clicking on the "−" button 132 again reduces the number to one search window 112. The function of the "+" and "−" buttons may be implemented, for example, with the Ajax programming language to modify existing HTML code in real time.

To implement multiple searches simultaneously on for example, Google, a query string with multiple search term parameters is sent. The receiving page then parses the query string, determines how many search term parameters are submitted, and accordingly sets up the search results page with the corresponding number of iframes. It then executes a search query for each search term and sends the results of the query for each search term to the corresponding iframe on the search results page.

In some embodiments, rolling over a search results provides a preview of the search result. In one embodiment, clicking on a search result link may display the destination within the iframe column, replacing the list of search results with a destination page. Consequently, specific display pages may be compared in a side-by-side fashion in the adjacent iframes. To return the iframes to search results, one or more "Back" buttons may be implemented.

Figure 18:
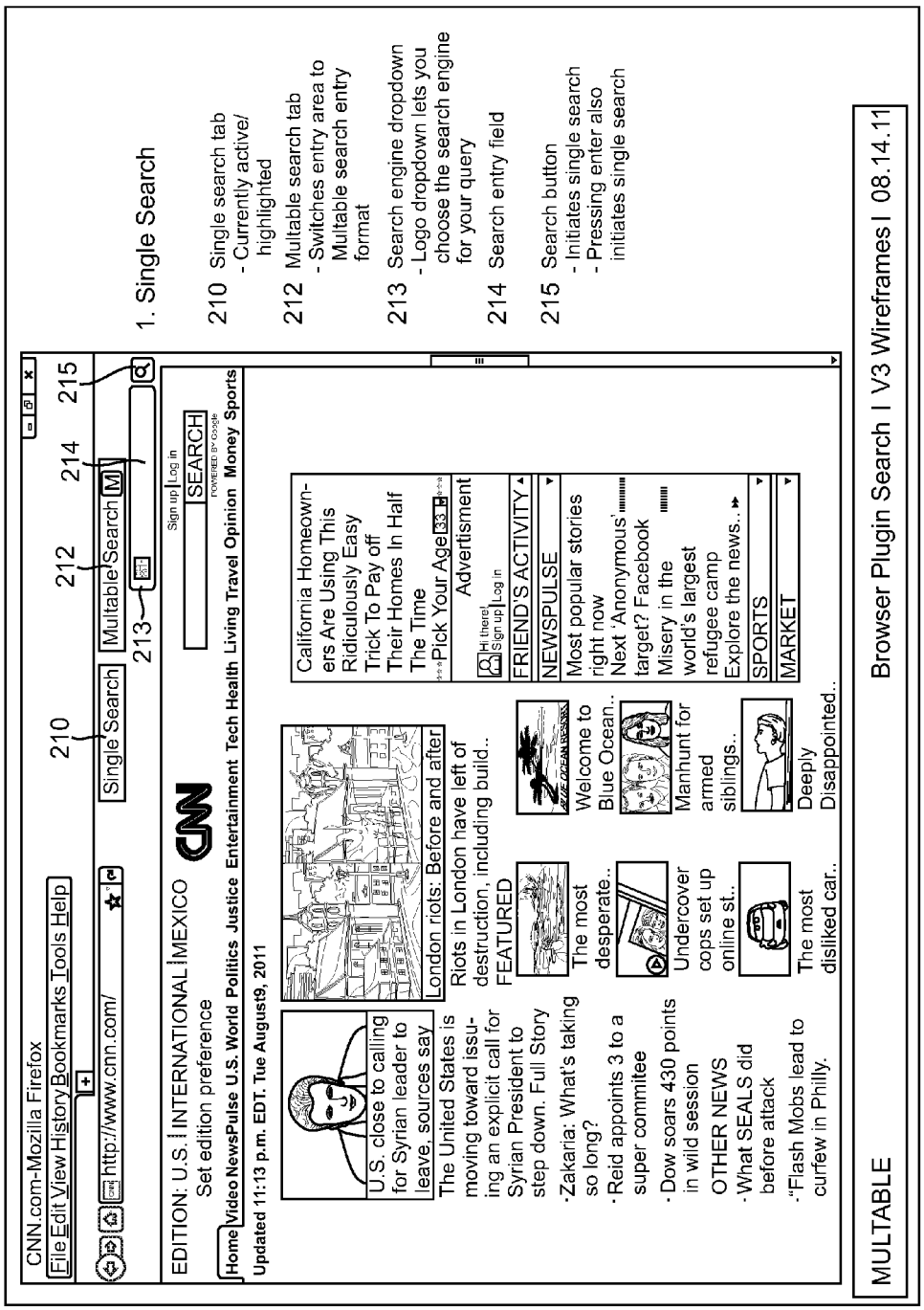
FIG. 18 illustrates a search screen that is configured for a single search, but which the user can reconfigure for multiple simultaneous searches.

Any choice of search engines may be used, such as Google, Yahoo!, Bing or others. The multiple search field concept may be implemented by way of a browser plug-in, for example, that uses JAVA script and CSS calls to change the visibility and width of the search input fields. FIGS. 18-22 illustrate one example of an embodiment that utilizes a plug-in. The screenshot of FIG. 18 illustrates a single search tab 210 which may be highlighted when active. A multable search tab 212 may also be present. A dropdown menu 213 may be optionally provided to allow the user to choose which search engine she or he prefers for the search. Initially, the user is presented with a single search entry field 214. If the user wishes to initiate a conventional search, a standard search button may be provided.

Figure 19:
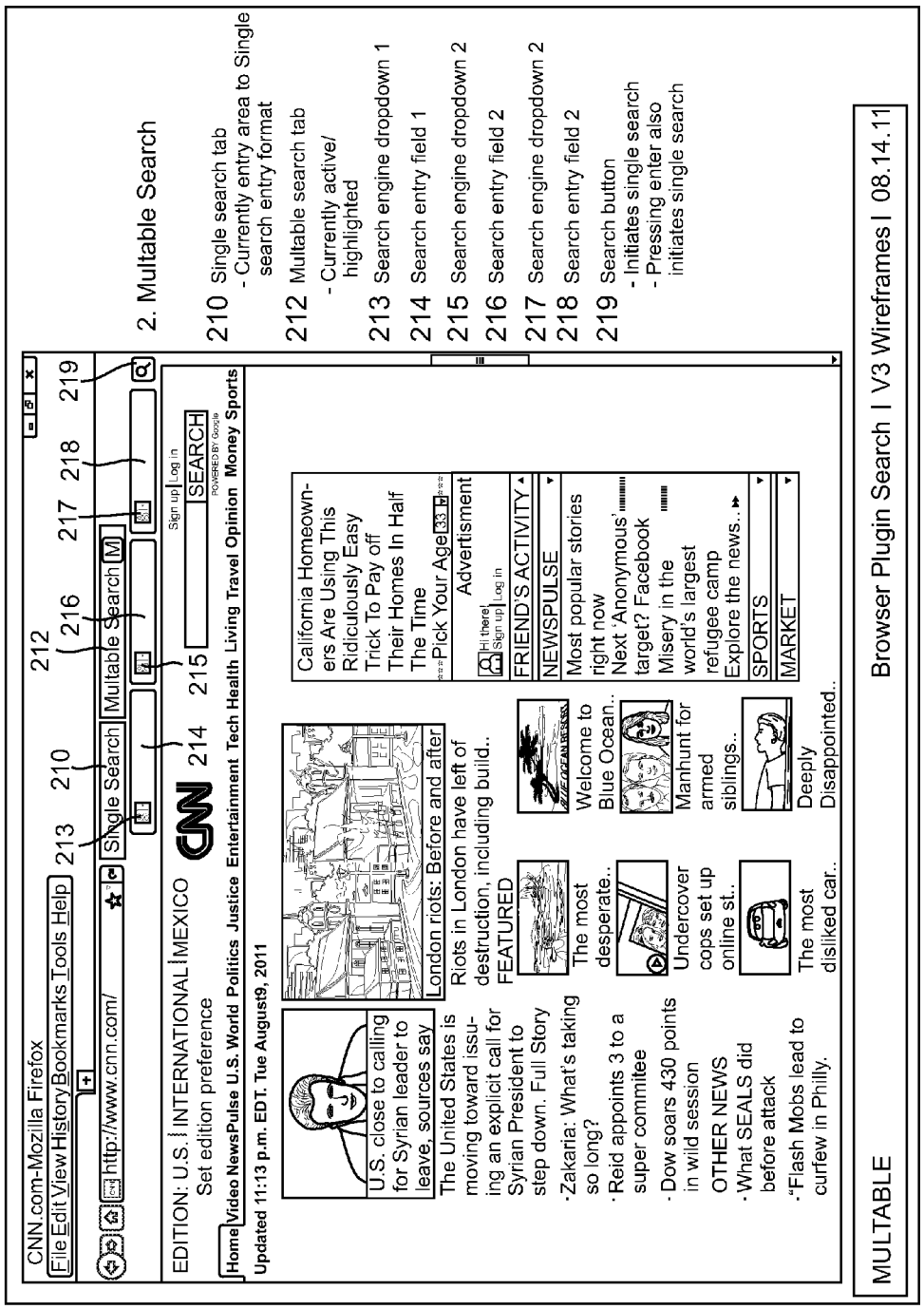
FIG. 19 illustrates an embodiment of FIG. 18 in which multiple search windows have been opened.

FIG. 19 illustrates a screen in which the multable search option has been activated. In this configuration, the user is presented with two or more search windows 214, 216, 218 each associated with a corresponding dropdown menu 213, 215, 217 from which a particular search engine from among a plurality of search engine choices may be chosen for that particular search window. In the example of FIG. 19, there are three search windows 214, 216, 218, into which three separate search strings may be entered. If the user chooses, each search string may be searched on a different search engine.

So, for example, search results from different search engines may be displayed in each of the iframe columns. For instance, if the user selects a single search window, results from a first search engine may be displayed. If the user expands to a second search window, search results for the second search term may be returned from a different search engine than the results for the first search term. If the user expands to a third search window, search returns from a third search engine may be displayed in the third iframe column. The user may choose, for example, to input the same search term in each of the search windows, in order to generate search results from different search engines in a side-by-side comparison. In a further embodiment, buttons or drop-down menus may be provided to permit the user to select the search engine to be used for each search window.

Figure 20:
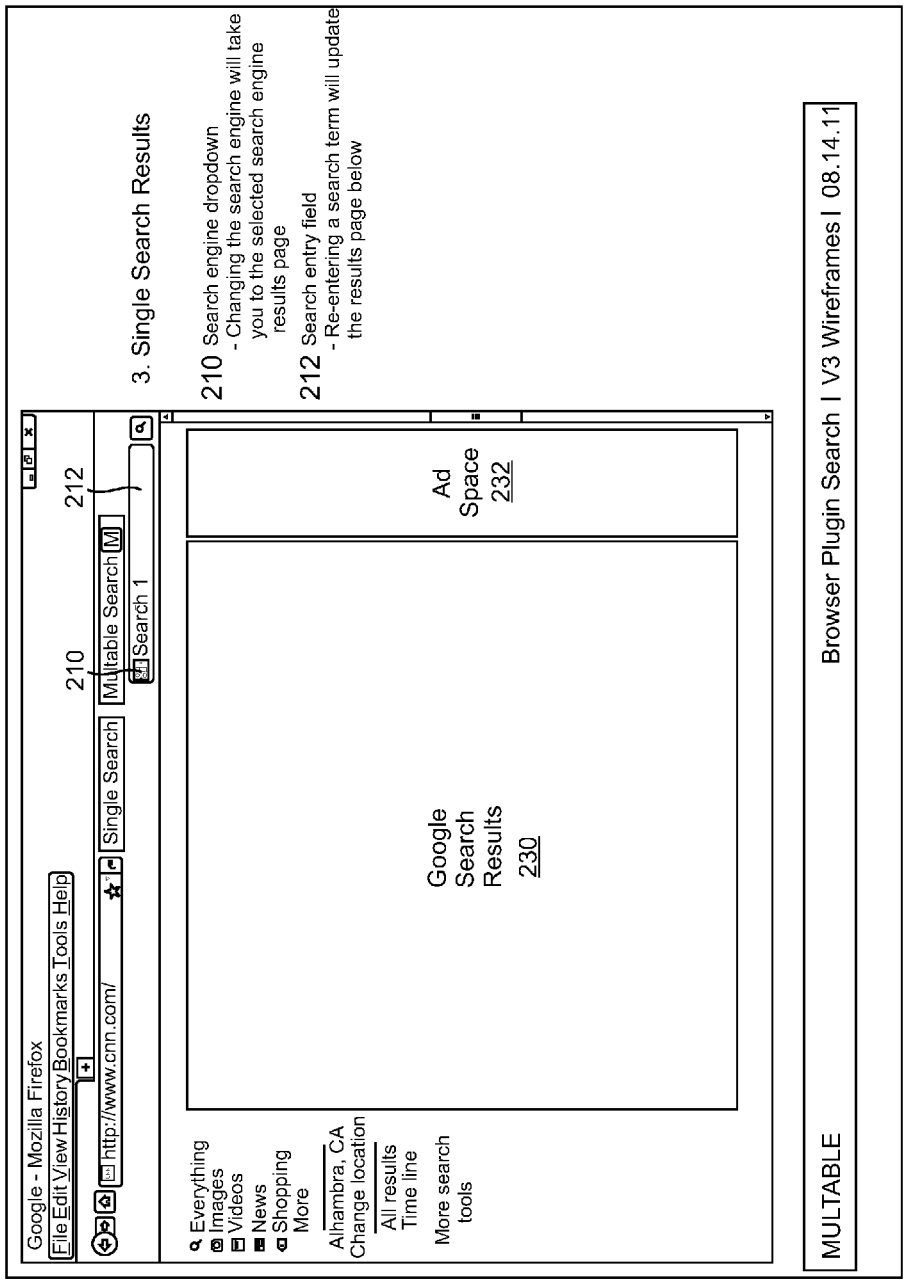
FIG. 20 illustrates a screen of the embodiment of FIG. 18 in which the user has conducted a single search.
Figure 21:
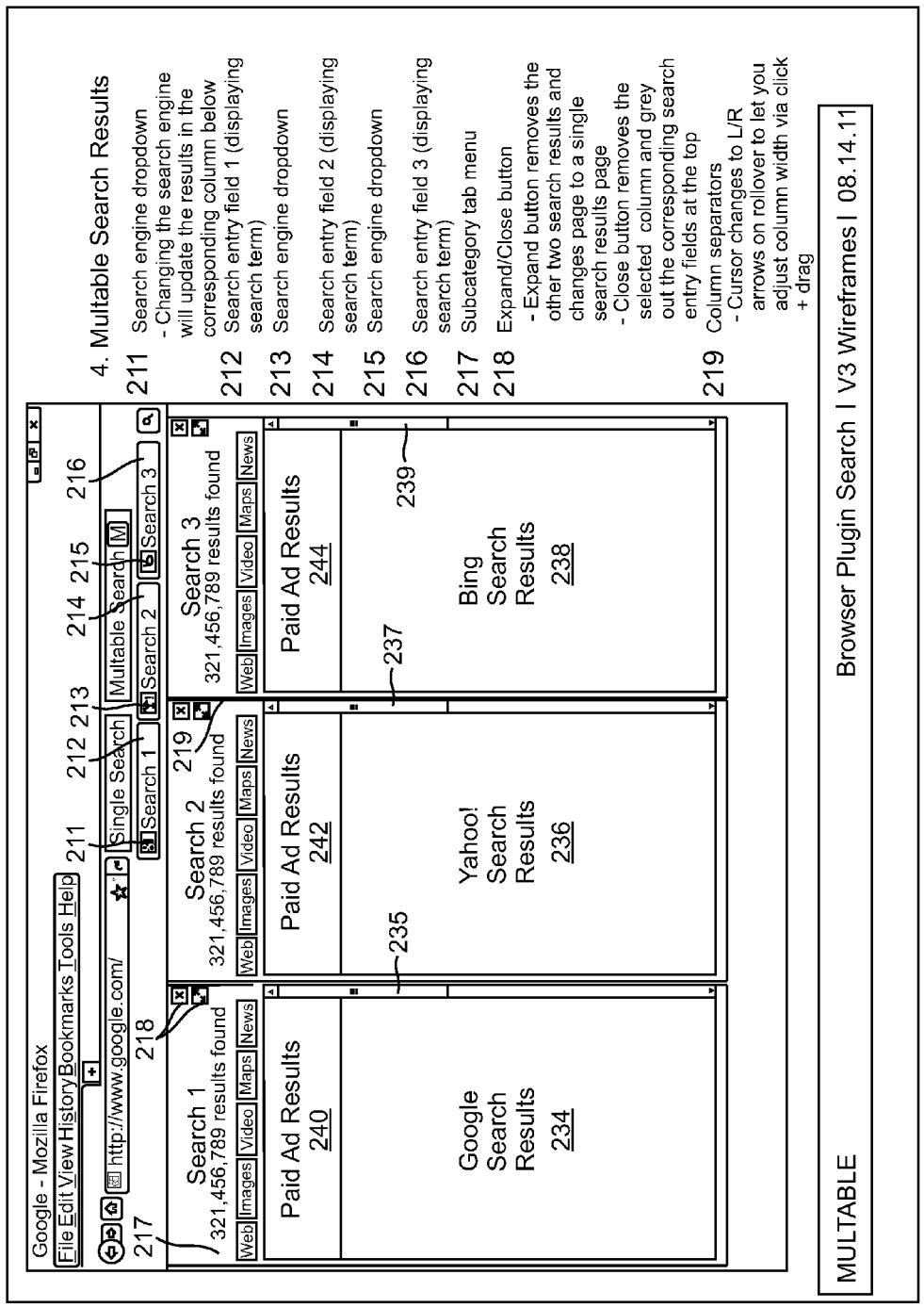
FIG. 21 illustrates a screen of the embodiment of FIG. 18 in which search results and corresponding paid ad results are displayed for three separate searches.

As illustrated in FIG. 20, in a screen showing the search results for a standard single search, the search results may be displayed on one portion of the screen 230, while space 232 may be reserved for advertisements, for example. In contrast, a screen showing search results for multiple searches as in FIG. 21 may include separate search results frames 234, 236, 238. In one embodiment, there are scroll bars 235, 237, 239 associated with each column of search results. Paid ad results corresponding to each frame may be allocated, at 240, 242 and 244, for example. The user may optionally be permitted to adjust the size of the search results columns by, for example, rolling the cursor over the boundary line of one search result column, then adjusting the column width with a click and a drag.

Figure 22:
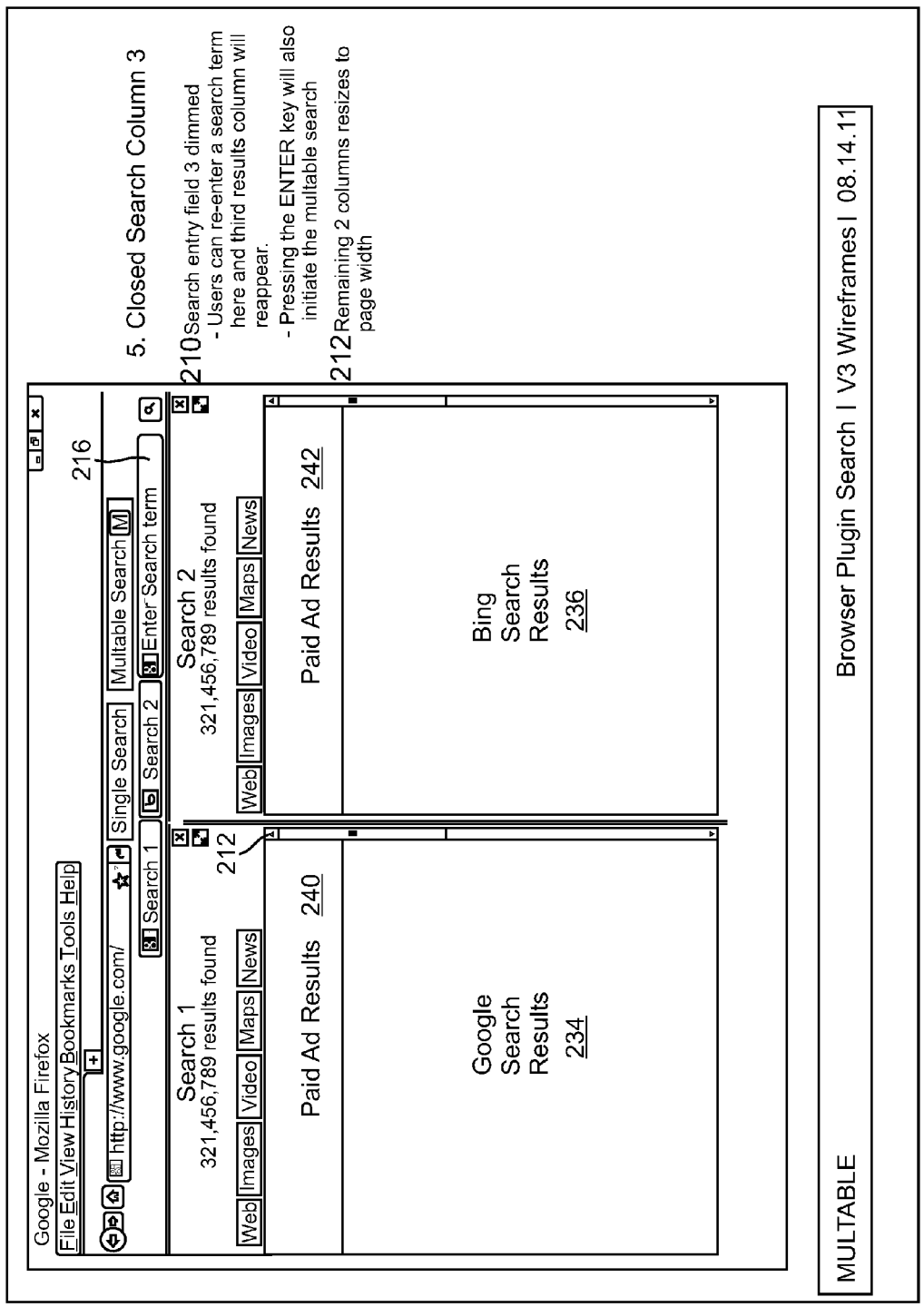
FIG. 22 illustrates a screen of the embodiment of FIG. 18 in which search results and corresponding paid ad results are displayed for a reduce number of separate searches.

The screen may be configured to accept two search terms, for example, rather than three, as in FIG. 22. If the user enters a search term into the third (now dimmed) search term window 216, the third column of search results 238 (FIG. 21) may reappear once a search is initiated.

Figure 23:
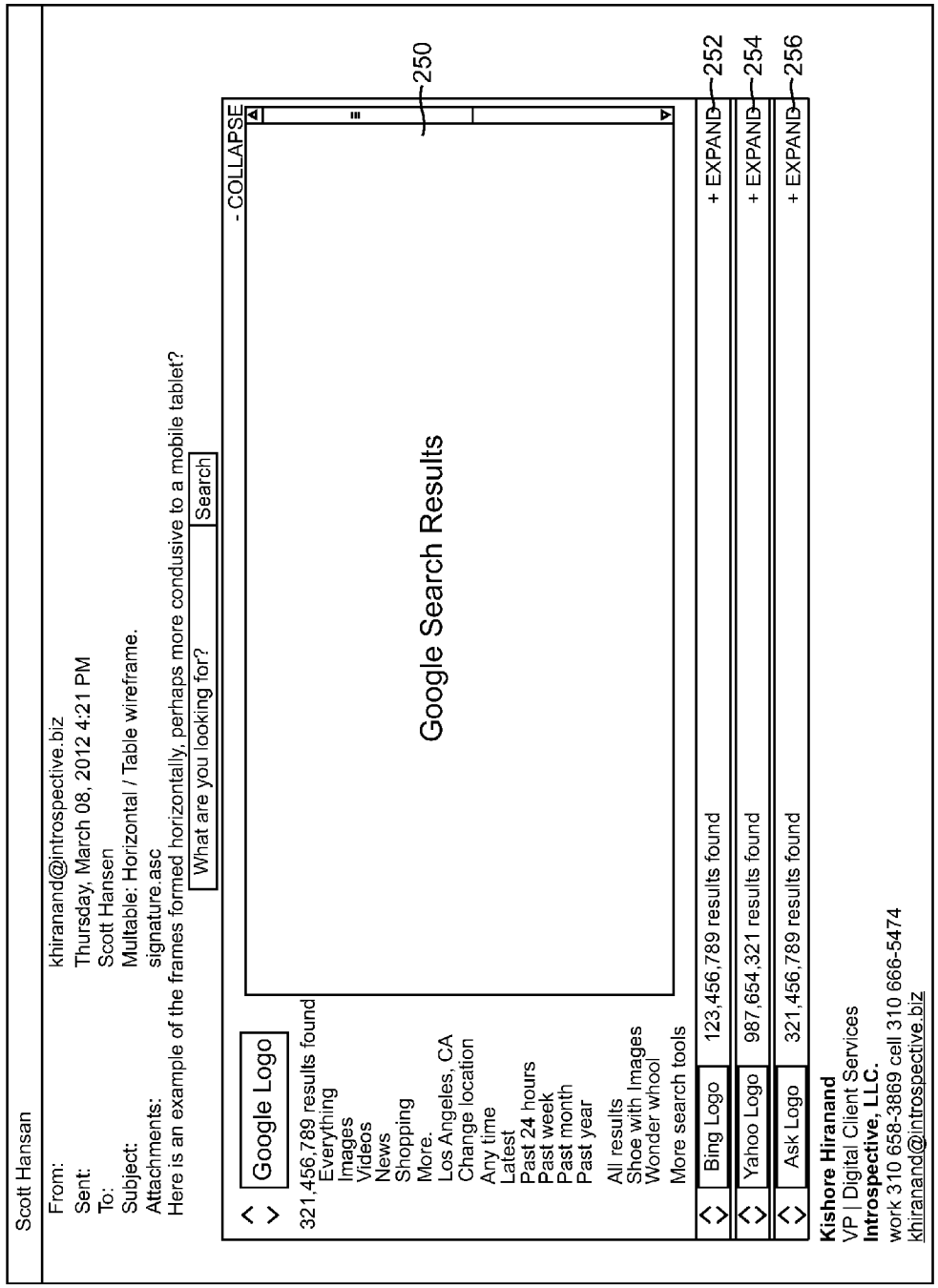
FIG. 23 illustrates one embodiment for a mobile or tablet screen, in which the user may selectively activate separate search result screens as desired.

In another embodiment, the technology is adapted for use on smaller screens, such as on mobile devices, as found for example on smart phones, tablets, PDA's and the like. Rather than having columns of side-by-side search results, for example, bars may be presented on the screen of the mobile device. To view the results corresponding to the first search term, for instance, the user would click or tap on the first bar. To view the results corresponding to the second search term, the user could collapse the results 250 of the first search term, and tap on a second bar 252 to view the search results corresponding to the second search term, and so on. FIG. 23 illustrates such a scenario. In this example, four search result windows are provided. The top window includes search results from one search engine, while collapsed results are available for selective expansion below. For example, when the user has studied the search results of the first search results window 252, the user may collapse the first search results window, then click on one of the horizontal bars 252, 254, 256 below to expand a second search results window. The user may do so sequentially in order to go through all of the search results. Some screens will be large enough for the user to view two or more search results screens at once, at the user's option.

As another alternative, the frames need not be equally-sized. There may be a desire to have a primary search results column that is wider than other search results screens. As a further alternative, the location of the frames on the screen may be varied as desired.

Other modifications and improvements may be made without departing from the scope of the invention.

The invention claimed is:

1. A system comprising:
a processor;
tangible, non-transitory media that stores a program that when executed by the processor is configured to perform operations, comprising:
receiving a request from a requesting user to reconfigure a search screen on a display;
adding at least one search window to the search screen in response to a request from a user;
receiving a plurality of search requests from the search screen;
performing a plurality of searches to perform a separate search resulting in separate search results for each of the search requests; and
displaying each of the search results in a separate search result frame on a display;
wherein:
each separate frame is displayed on the screen as one of a separate column and a separate row;
the system further comprises receiving at least two different choices of search engines from among a plurality of search engine choices by the requesting user, and utilizing search engines specified by the requesting user to perform searches;
the system includes receiving a request to change the number of search windows on the screen and, in response, changing the number of search windows displayed on the screen;
the system comprises a dynamic screen configuration function in which the system configures the number of search results frames on a screen based on user input received, to correlate the number of search results frames that are displayed on the screen with the number of search windows that are displayed on the screen; and
the step of displaying each of the search results comprises displaying search results corresponding to input in a first search window in a first search result frame, and displaying search results corresponding to input in a second search window in a second search result frame.

2. A system as defined in claim 1, wherein the system includes receiving a request to decrease the number of search windows on the screen and, in response, decreasing the number of search windows displayed on the screen.

3. A system as defined in claim 1, wherein the system includes displaying sponsored links in conjunction with the display of search results.

4. A system as defined in claim 1, wherein the system includes receiving a request to reduce the number of frames of search results and, in response, reducing the number of frames of search results.

5. A system as defined in claim 1, wherein the system includes receiving a request to reduce the display of sponsored ads and, in response, reducing the display of sponsored ads.

6. A system as defined in claim 1, wherein the system includes a plug-in for a browser, wherein the plug-in configures the browser for use in the system.

7. A system as defined in claim 1, wherein the system displays search results on the screen of a mobile device.

8. A system as defined in claim 7, wherein the system displays a plurality of search results for a plurality of search strings on the screen of a mobile device, wherein at least one set of search results is initially collapsed until expanded by the user.

9. A system as defined in claim 8, wherein the search results are displayed in horizontal frames extending across at least a portion of the display.

10. A system as defined in claim 7, wherein the mobile device is one of a smart phone, tablet and PDA.

11. A system as defined in claim 1, wherein the system receives a request from the user to scroll through search results of multiple, concurrent searches, and the search results are scrolled concurrently.

12. A system as defined in claim 1, wherein the system receives a request to move the boundary of a search result frame and, in response, the boundary of the search result frame is moved.

13. A system as defined in claim 1, wherein the system receives an indication that the cursor has rolled over a search result, and the system displays a preview of the search result.

14. A system as defined in claim 1, wherein the system includes pagination with the search results, to display multiple pages of search results within a frame.

15. A system as defined in claim 1, wherein the system includes receiving a request to display the destination of a search result within the frame, and replacing the list of search results with a destination page.

16. A system as defined in claim 1, wherein display of search results comprises a comparison of information gathered from at least one of shopping sites, product sites and travel sites.

17. A system as defined in claim 1, wherein the system further comprises executing a nonsearch application and displaying output from the application in a further frame on the display.

18. A system having a first and a second mode, the system comprising:
   a processor;
   tangible, non-transitory media that stores a program that when executed by the processor is configured to perform operations, comprising:
   receiving a request from a requesting user to reconfigure at least one of the number and position of frames on a display;
   adding at least one input window to the screen;
   receiving a plurality of requests from the search screen;
   executing a plurality of applications resulting in separate output for each of the requests;
   displaying output from each application in a separate output frame on a display;
   displaying an icon on the display;
   in a first mode, receiving information that a user has activated the icon and in response increasing the number of input windows and a corresponding number of output frames displayed on the display; and
   in a second mode, receiving information that a user has activated the icon and in response decreasing the number of input windows and a corresponding number of output frames displayed on the display;
   wherein the output frames are arranged adjacent to one another in one of rows and columns on the screen for convenient comparison.

19. A system as defined in claim 18, wherein at least one of the applications is a search.

20. A system as defined in claim 18, wherein the applications are each a different search engine selected by a user from among a plurality of search engine choices, and each of the output frames is a search output frame, and the step of displaying output from each application comprises displaying search results from each search in a separate search result frame on the display.

21. A system as defined in claim 20, wherein the separate search result frames are arranged side-by-side on the display.

* * * * *